(12) United States Patent  (10) Patent No.: US 8,248,715 B2
Asami et al.  (45) Date of Patent: Aug. 21, 2012

(54) IMAGING LENS AND IMAGING APPARATUS USING IMAGING LENS

(75) Inventors: Taro Asami, Saitama (JP); Ryoko Otomo, Saitama (JP)

(73) Assignee: Fujifilm Corporation, Tokyo (JP)

( * ) Notice: Subject to any disclaimer, the term of this patent is extended or adjusted under 35 U.S.C. 154(b) by 301 days.

(21) Appl. No.: 12/635,014

(22) Filed: Dec. 10, 2009

(65) Prior Publication Data

US 2010/0142062 A1  Jun. 10, 2010

(30) Foreign Application Priority Data

Dec. 10, 2008 (JP) .............................. P2008-313893
Dec. 1, 2009 (JP) .............................. P2009-273449

(51) Int. Cl.
*G02B 9/62* (2006.01)
*G02B 13/04* (2006.01)
(52) U.S. Cl. ........................ 359/762; 359/752
(58) Field of Classification Search .................. 359/762, 359/754–756, 761, 749–752, 691
See application file for complete search history.

(56) References Cited

U.S. PATENT DOCUMENTS

| | | | | |
|---|---|---|---|---|
| 6,697,202 B2* | 2/2004 | Mori | .............................. | 359/749 |
| 7,023,628 B1 | 4/2006 | Ning | | |
| 7,636,205 B2* | 12/2009 | Yamamoto | ..................... | 359/781 |
| 7,656,591 B2* | 2/2010 | Yamamoto | ..................... | 359/750 |
| 7,733,576 B2* | 6/2010 | Kawana | ........................ | 359/691 |
| 7,768,719 B2* | 8/2010 | Jung et al. | ..................... | 359/762 |
| 7,787,191 B2* | 8/2010 | Wang | ............................ | 359/682 |
| 2010/0277816 A1* | 11/2010 | Kweon et al. | ................. | 359/755 |

FOREIGN PATENT DOCUMENTS

| | | |
|---|---|---|
| JP | 61-123810 A | 6/1986 |
| JP | 2599312 B2 | 4/1997 |
| JP | 2007-139985 A | 6/2007 |
| JP | 2007-279632 A | 10/2007 |

* cited by examiner

*Primary Examiner* — Jordan Schwartz
(74) *Attorney, Agent, or Firm* — Birch, Stewart, Kolasch & Birch, LLP

(57) ABSTRACT

An imaging lens is provided and includes, in order from the object side, a front group having a negative power, a stop, and a rear group having a positive power. The front group includes, in order from the object side, a first negative lens having a meniscus shape with a concave surface on an image side, a second negative lens, and a third positive lens. The rear group includes, in order from the object side, a fourth positive lens, a fifth negative lens having a meniscus shape with a concave surface on the object side, and a sixth positive lens. An Abbe number of each of the first lens, the second lens, the fourth lens, and the sixth lens at the d-line is equal to or larger than 40, and an Abbe number of each of the third lens and the fifth lens at the d-line is equal to or smaller than 40. Each lens constituting the front group and the rear group is a single lens.

24 Claims, 17 Drawing Sheets

EXAMPLE 1

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

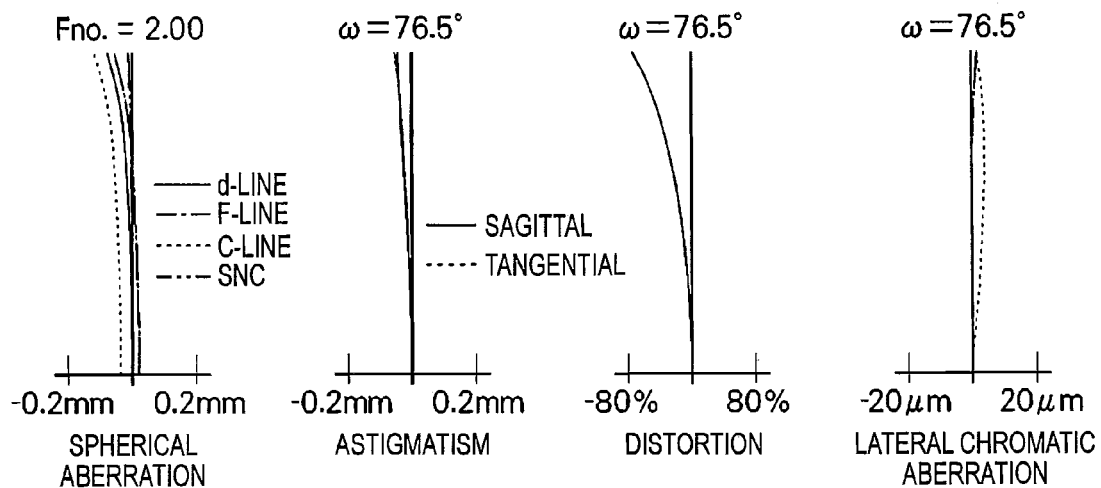
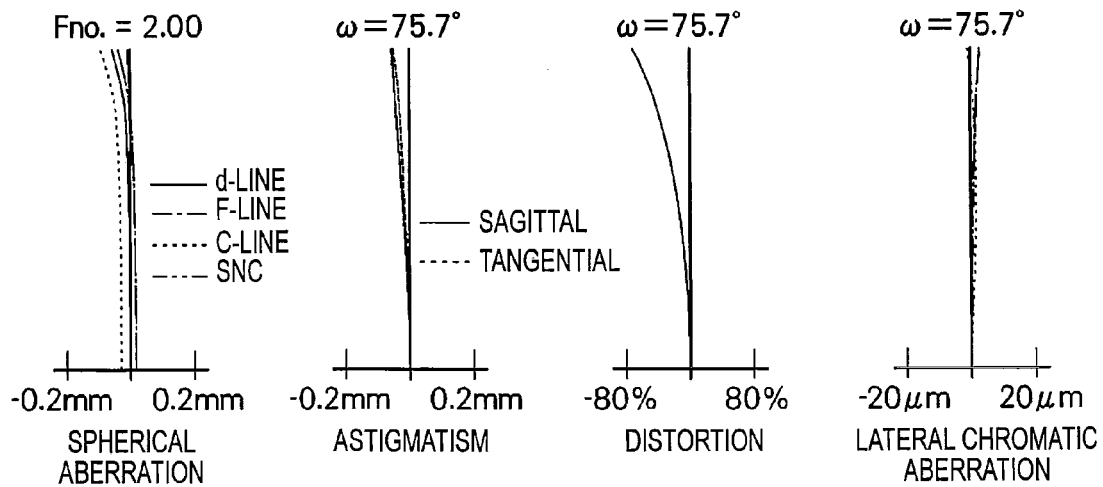

EXAMPLE 3

EXAMPLE 4

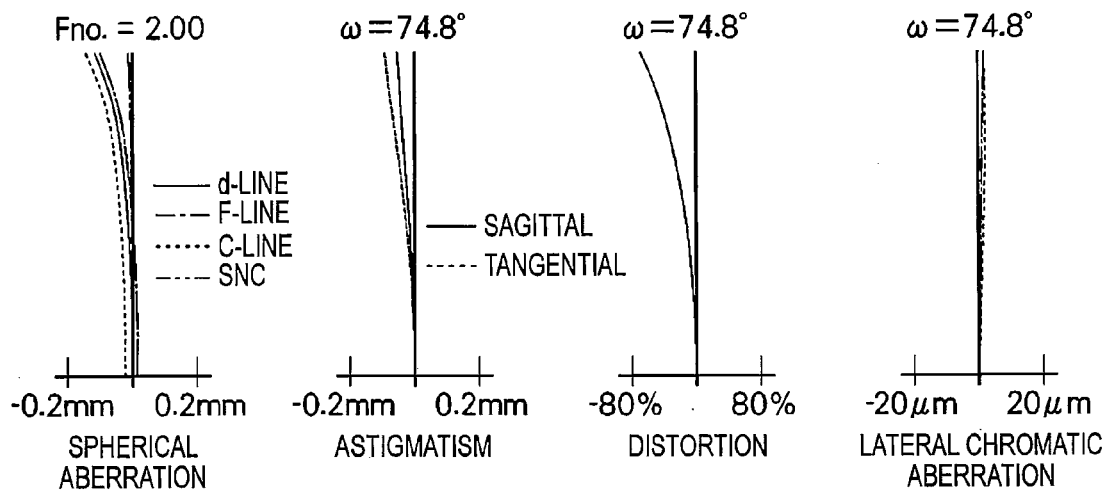
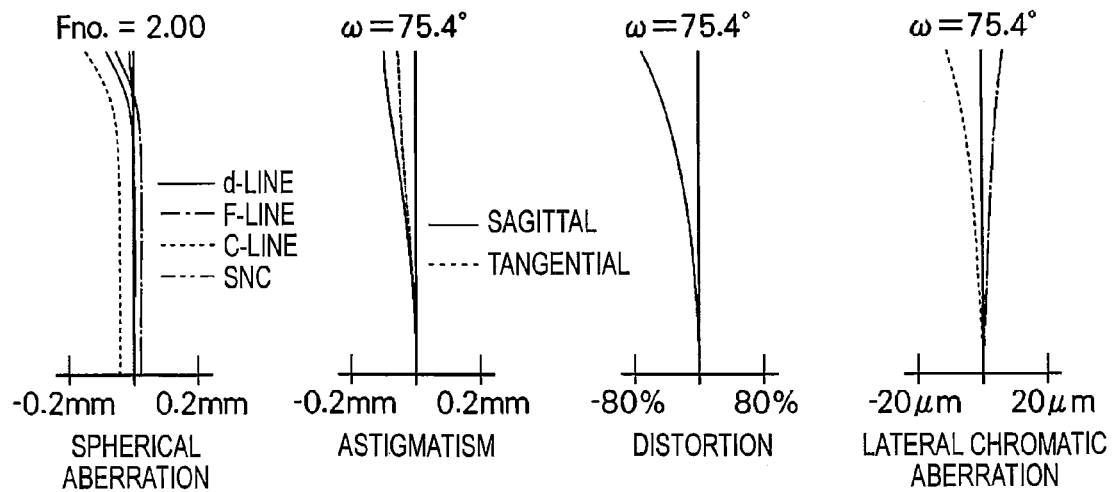

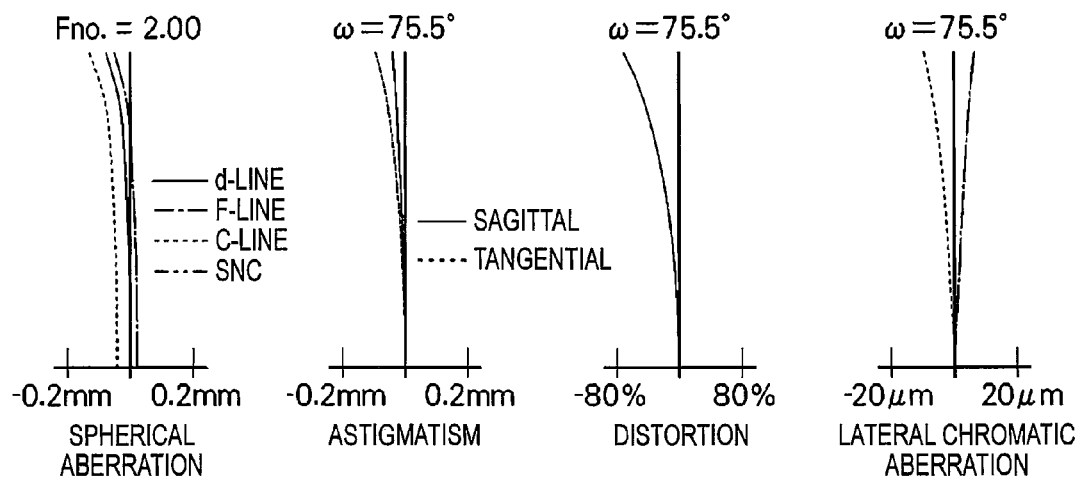
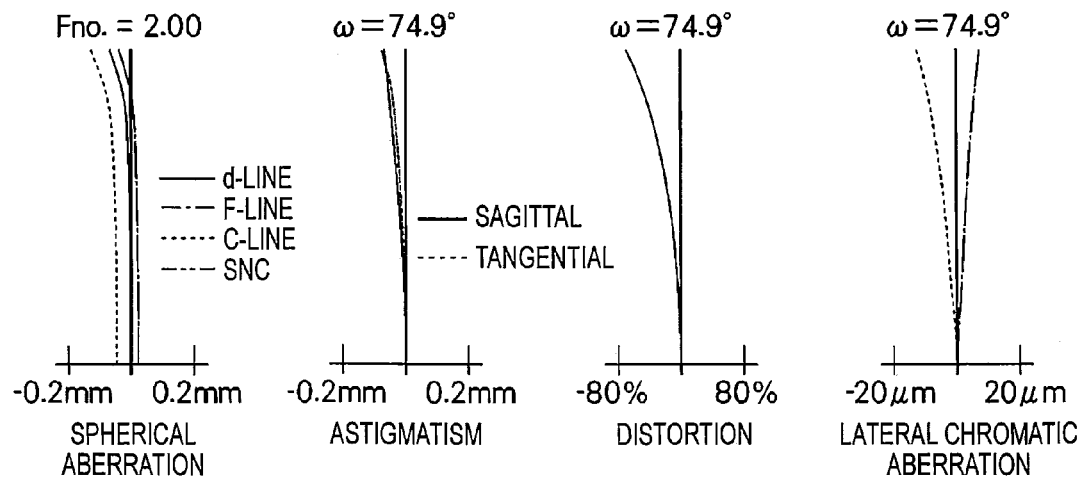

EXAMPLE 9

EXAMPLE 10

IMAGING LENS AND IMAGING APPARATUS USING IMAGING LENS

This application is based on and claims priority under 35 U.S.C §119 from Japanese Patent Application Nos. 2008-313893 and 2009-273449, filed on Dec. 10, 2008 and Dec. 1, 2009, respectively, the entire disclosure of which is herein incorporated by reference.

BACKGROUND OF THE INVENTION

1. Field of the Invention

The present invention relates to an imaging lens imaging a subject and an imaging apparatus using the imaging lens.

2. Description of Related Art

A compact imaging lens is known which is used in an imaging apparatus, such as an onboard camera or a surveillance camera. An imaging device which includes a compact CCD or CMOS having a large number of pixels for use in such an imaging apparatus, or a compact imaging lens which is assembled with the imaging device is also known.

As an imaging lens used in such an imaging apparatus, imaging lenses described in U.S. Pat. No. 7,023,628, Japanese Patent No. 2599312, JP-A-61-123810, JP-A-2007-279632, and JP-A-2007-139985 are also known in which a cemented lens is used so as to achieve reduction in size.

The imaging lens described in U.S. Pat. No. 7,023,628 is a fast lens having an F number of 2.0, but multiple lenses made of a material having a refractive index larger than 1.9 are used, which causes an increase in costs. The imaging lens described in Japanese Patent No. 2599312 or JP-A-2007-279632 uses an aspheric lens. When this imaging lens is used as a lens for an onboard camera or a lens for a surveillance camera, if a lens is made of plastic, a significant change in performance occurs due to temperature. Further, the use of a lens formed by a glass mold causes an increase in costs. The imaging lens described in JP-A-61-123810 is a lens having an F number of 2.8 to 4.0, and is too slow to use in an onboard camera or a surveillance camera. The lens described in each of U.S. Pat. No. 7,023,628, Japanese Patent No. 2599312, JP-A-61-123810, and JP-A-2007-279632 includes a cemented lens, so there is still room for improvement in terms of environmental resistance.

In the lens described in JP-A-2007-139985, multiple aspheric surfaces are used, and one of the lens surfaces is a diffractive optical surface. For this reason, when a lens is made of plastic, a significant change in performance occurs due to temperature. Further, the use of a lens formed by a glass mold causes an increase in costs.

As an imaging lens used in an onboard camera or a surveillance camera, there is a need for a fast (small F number), compact, and low-cost lens having excellent weather resistance with small deterioration in performance due to a change in temperature so as to be used in the inside of an automobile right on the equator in summer or in the outdoors of a cold area in winter.

In an imaging lens using a cemented lens, however, an adhesive material forming an adhesive layer is placed under a severe environment for a long time and then degenerated or modified, so the optical performance of the imaging lens is deteriorated.

Special processing may be performed so as to allow the cemented lens to be used under a severe environment, but this processing causes an increase in costs.

This problem generally occurs when an imaging lens using a cemented lens is used under a severe environment, regardless of whether it is an onboard camera or a surveillance camera.

SUMMARY OF THE INVENTION

In consideration of the above-described situation, an object of the invention is to provide an imaging lens capable of improving environmental resistance without deteriorating lens performance or without causing an increase in manufacturing costs, and an imaging apparatus using the imaging lens.

According to a first aspect of the invention, there is provided an imaging lens including, in order from the object side, a front group having a negative power, a stop, and a rear group having a positive power. The front group includes, in order from the object side, a first negative lens having a concave surface on an image side, a second negative lens where an object-side lens surface thereof has a radius of curvature whose absolute value is larger than that of an image-side lens surface thereof, and a third positive lens. The rear group includes, in order from the object side, a fourth positive lens, a fifth negative lens having a meniscus shape with a concave surface on the object side, and a sixth positive lens. An Abbe number of each of the first lens, the second lens, the fourth lens, and the sixth lens at the d-line is equal to or larger than 40, and an Abbe number of each of the third lens and the fifth lens at the d-line is equal to or smaller than 40. Each lens constituting the front group and the rear group is a single lens.

According to a second aspect of the invention, there is provided an imaging lens including, in order from the object side, a front group having a negative power, a stop, and a rear group having a positive power. The front group includes, in order from the object side, a first negative lens having a concave surface on an image side, a second negative lens, and a third positive lens. The rear group includes two positive lenses and one negative lens. An Abbe number of each of the first lens and the second lens at the d-line is equal to or larger than 45, and an Abbe number of the third lens at the d-line is equal to or smaller than 25. An Abbe number of the negative lens constituting the rear group at the d-line is equal to or smaller than 25, and an Abbe number of each positive lens constituting the rear group at the d-line is equal to or larger than 45. Each lens constituting the front group and the rear group is a single lens. A distance from an object-side lens surface of the first lens to the imaging surface of the imaging lens is equal to or smaller than 18 mm.

The third lens may have a biconvex shape where an object-side lens surface thereof has a radius of curvature whose absolute value is smaller than that of an image-side lens surface thereof.

The two positive lenses constituting the rear group may have a biconvex shape.

The second lens may be a lens having a plano-concave shape with a flat surface on the object side or a meniscus lens where an object-side lens surface thereof has a radius of curvature whose absolute value is larger than that of an image-side lens surface thereof.

The imaging lens may satisfy the following conditional expression (1): $0.5 < R10/R9 < 1.0$. For the conditional expression (1), $R9$ is a radius of curvature of an image-side lens surface of a lens nearest to the object side from among the lenses constituting the rear group, and $R10$ is a radius of curvature of an object-side lens surface of a lens adjacent to the image side of a lens nearest to the object side from among the lenses constituting the rear group.

The imaging lens may satisfy the following conditional expression (2): $0.8<|f12/f|<1.8$. For the conditional expression (2), f is a focal length of the imaging lens, and f12 is a composite focal length of the first lens and the second lens.

The imaging lens may satisfy the following conditional expression (3): $1.0<|f123/f456|<2.2$. For the conditional expression (3), f123 is a composite focal length of the front group, and f456 is a composite focal length of the rear group.

The imaging lens may satisfy the following conditional expression (4): $5<L/f<18$. For the conditional expression (4), f is a focal length of the imaging lens, and L is a distance from the object-side lens surface of the first lens to the imaging surface of the imaging lens.

In calculating the value L, an air-converted value is used for the distance (back focal length) from a lens surface nearest to the image side from among the lens surfaces constituting the imaging lens to the imaging surface of the imaging lens.

The imaging lens may satisfy the following conditional expression (5): $0.5<Bf/f<3.0$. For the conditional expression (5), f is a focal length of the imaging lens, and Bf is a back focal length.

The back focal length is a distance on the optical axis from a lens surface nearest to the image side from among the lens surfaces constituting the imaging lens to the imaging surface of the imaging lens. When cover glass or various filters are present between the imaging lens and the imaging surface, the air-converted values of the cover glass and the filters are used for Bf.

The imaging lens may satisfy the following conditional expression (6): $2.0<f45/f<6.5$. For the conditional expression (6), f is a focal length of the imaging lens, and f45 is a composite focal length of two adjacent lenses nearest to the object side from among the lenses constituting the rear group.

Each of the first lens to the sixth lens may be a glass lens.

According to a third aspect of the invention, there is provided an imaging apparatus including the imaging lens according to the first of the invention, and an imaging device converting an optical image formed by the imaging lens into an electrical signal.

According to a fourth aspect of the invention, there is provided an imaging apparatus including the imaging lens according to the second of the invention, and an imaging device converting an optical image formed by the imaging lens into an electrical signal.

BRIEF DESCRIPTION OF THE DRAWINGS

The features of the invention will appear more fully upon consideration of the exemplary embodiment of the invention, which are schematically set forth in the drawings, in which:

FIG. 12 is a diagram showing aberrations of the imaging lens of Example 1;

FIG. 13 is a diagram showing aberrations of the imaging lens of Example 2;

FIG. 16 is a diagram showing aberrations of the imaging lens of Example 5;

FIG. 17 is a diagram showing aberrations of the imaging lens of Example 6;

FIG. 18 is a diagram showing aberrations of the imaging lens of Example 7;

FIG. 19 is a diagram showing aberrations of the imaging lens of Example 8;

DETAILED DESCRIPTION OF THE EXEMPLARY EMBODIMENTS

Figure 1:
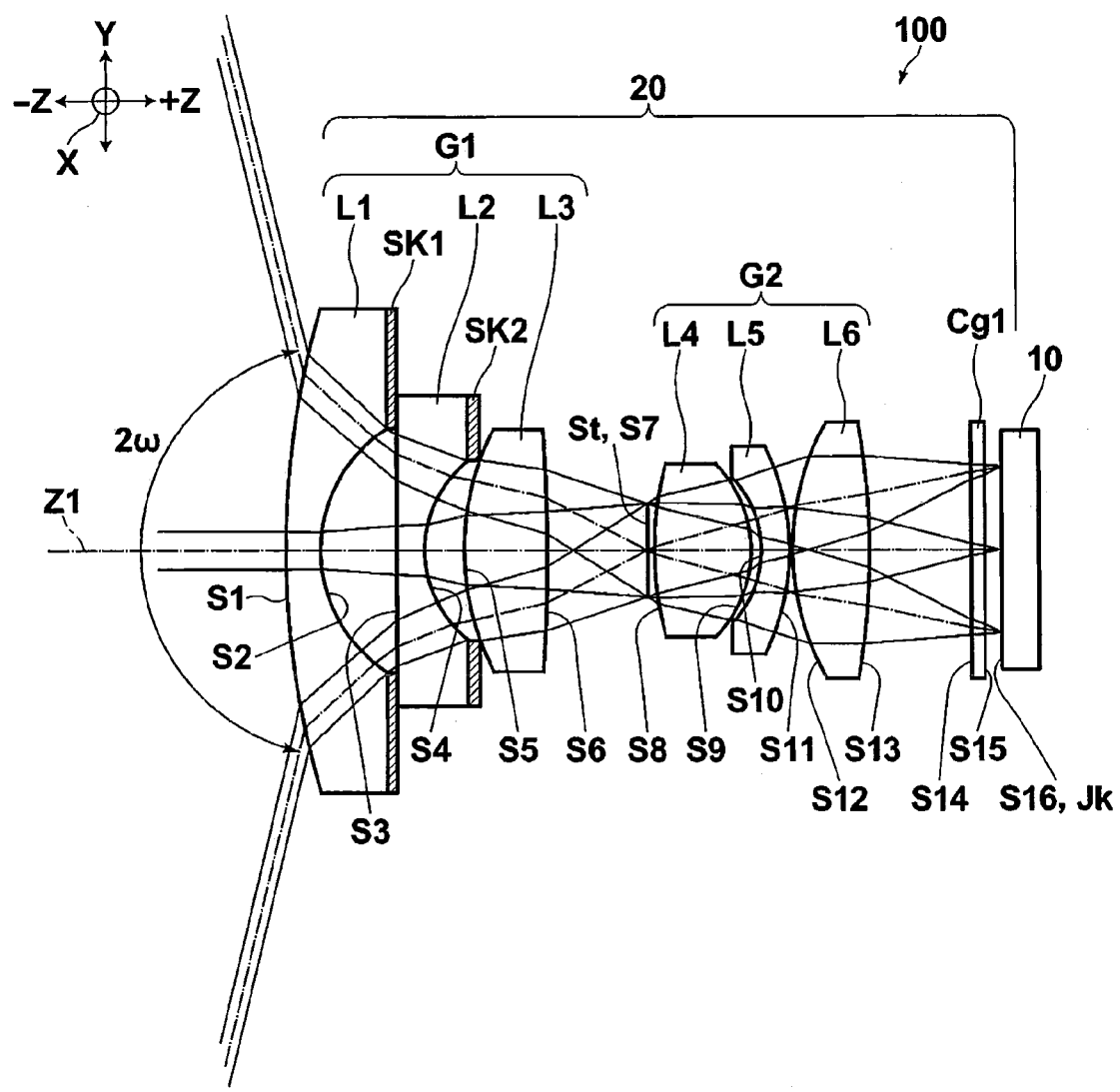
FIG. 1 is a sectional view showing the schematic configuration of an imaging lens and an imaging apparatus according to an exemplary embodiment of the invention.
Figure 2:
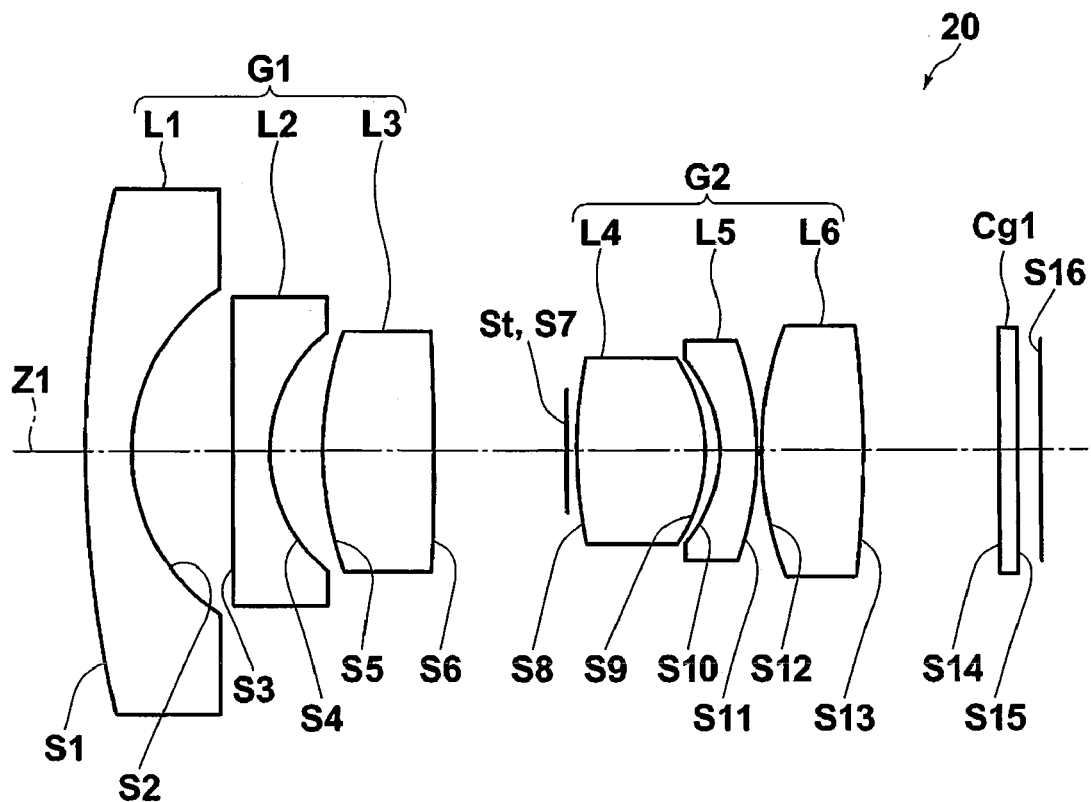
FIG. 2 is a sectional view showing the schematic configuration of an imaging lens of Example 1.
Figure 3:
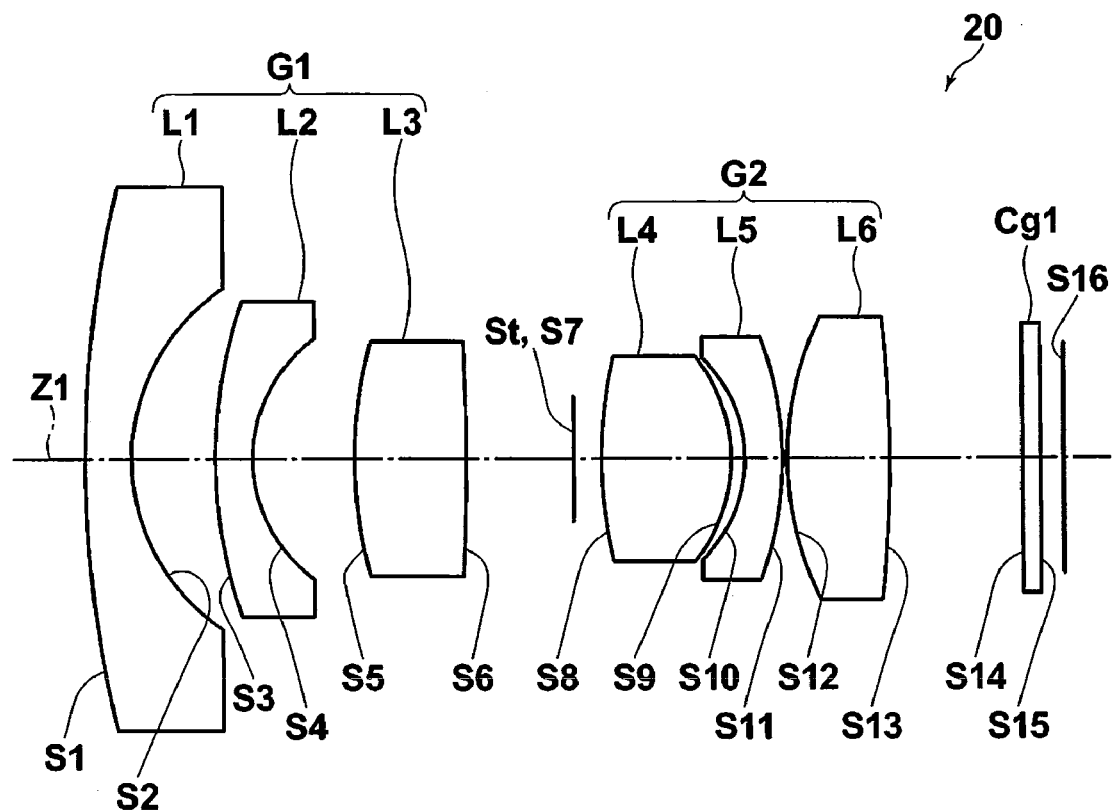
FIG. 3 is a sectional view showing the schematic configuration of an imaging lens of Example 2.
Figure 4:
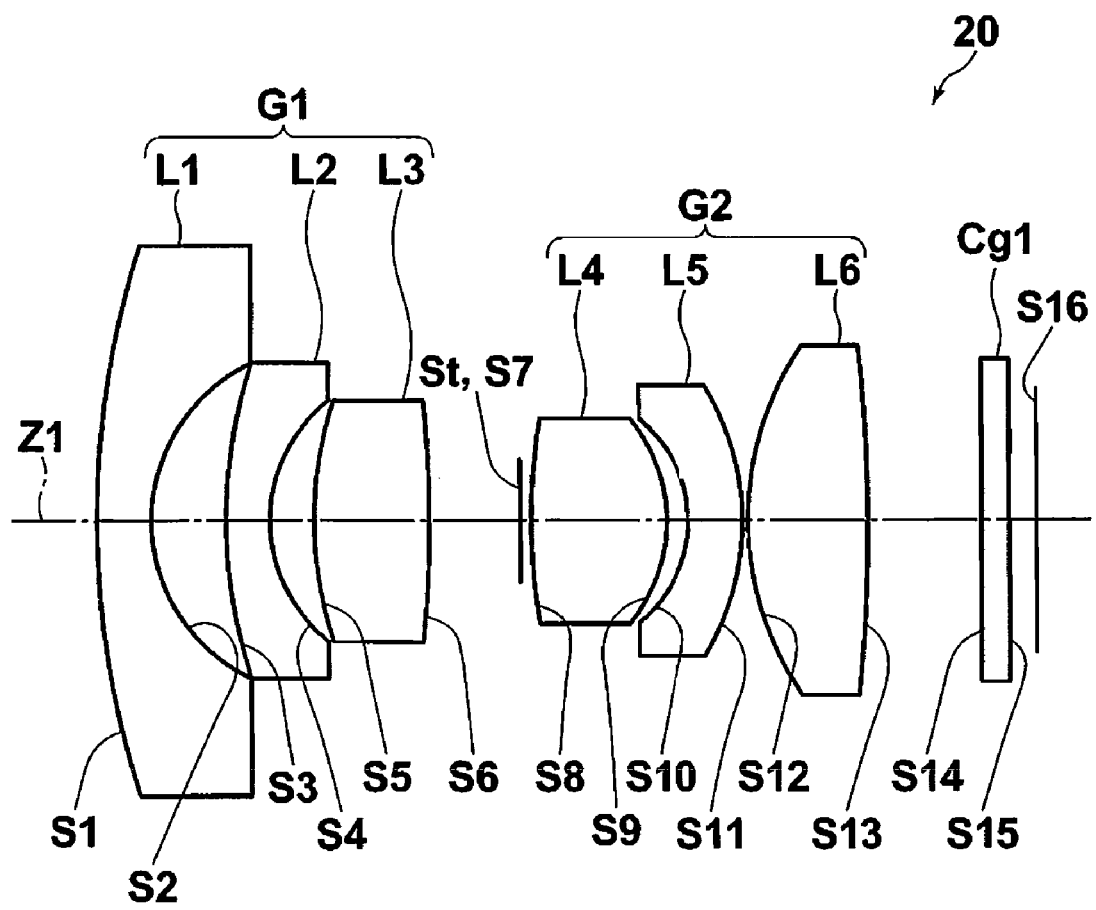
FIG. 4 is a sectional view showing the schematic configuration of an imaging lens of Example 3.
Figure 5:
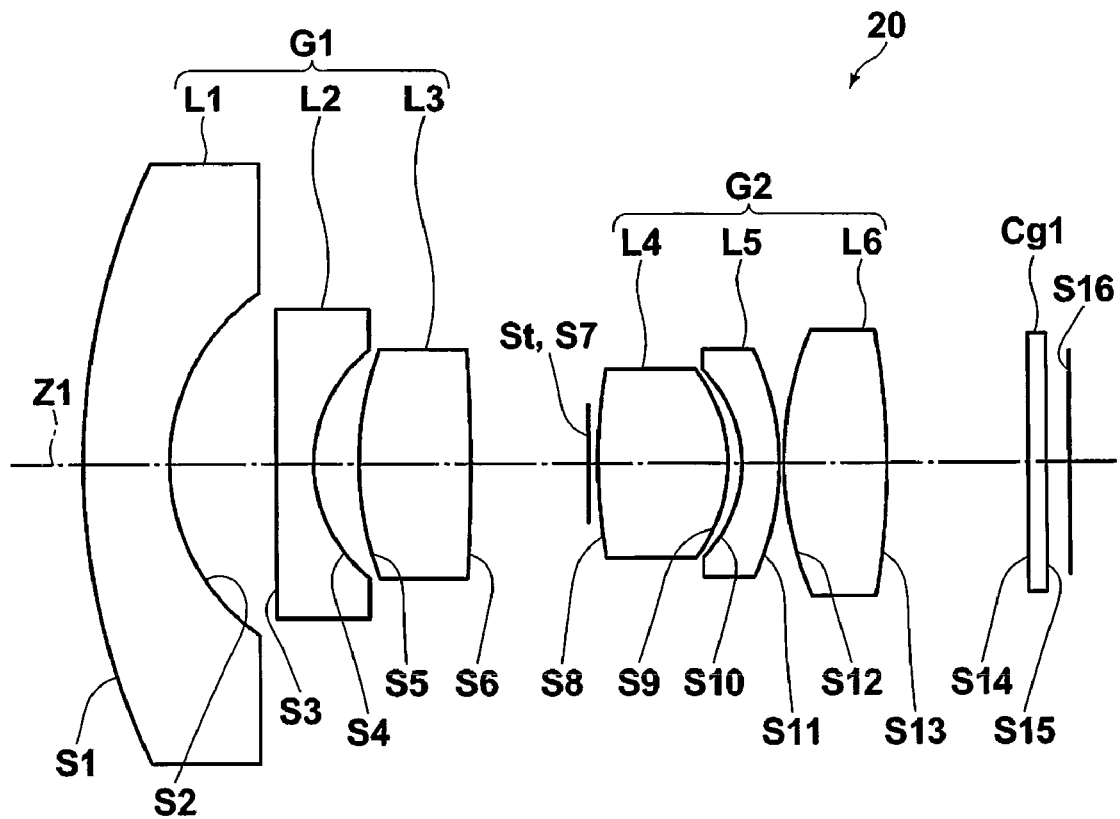
FIG. 5 is a sectional view showing the schematic configuration of an imaging lens of Example 4.
Figure 6:
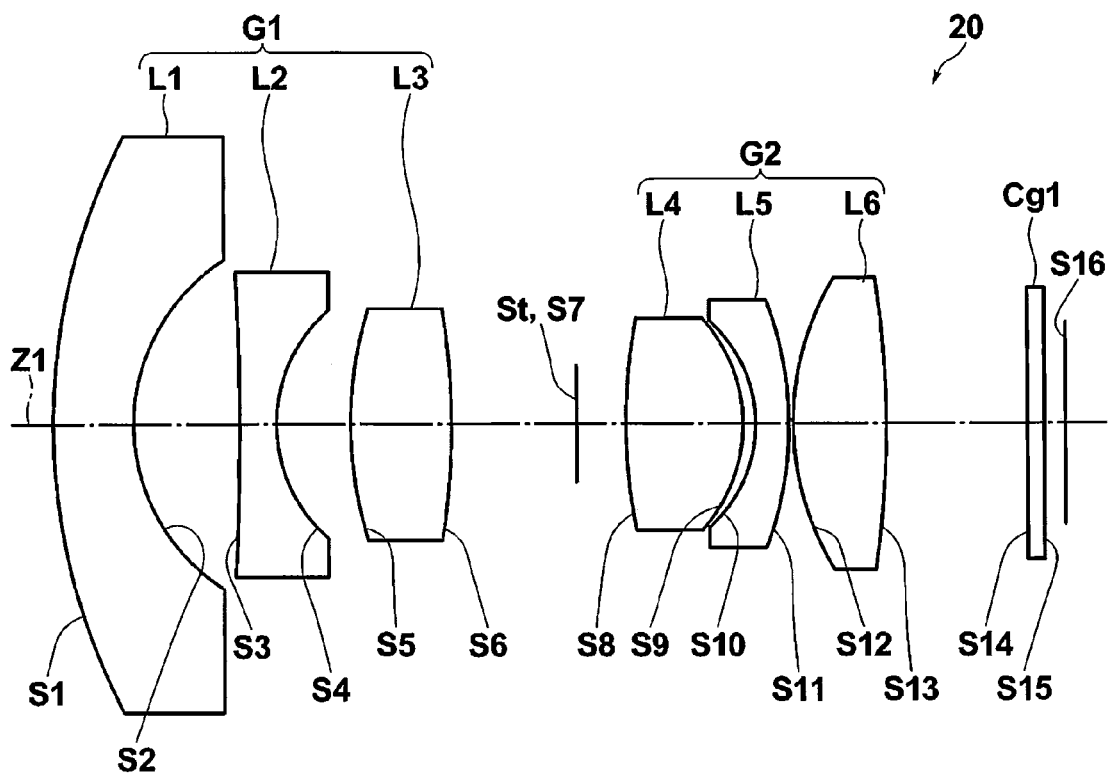
FIG. 6 is a sectional view showing the schematic configuration of an imaging lens of Example 5.
Figure 7:
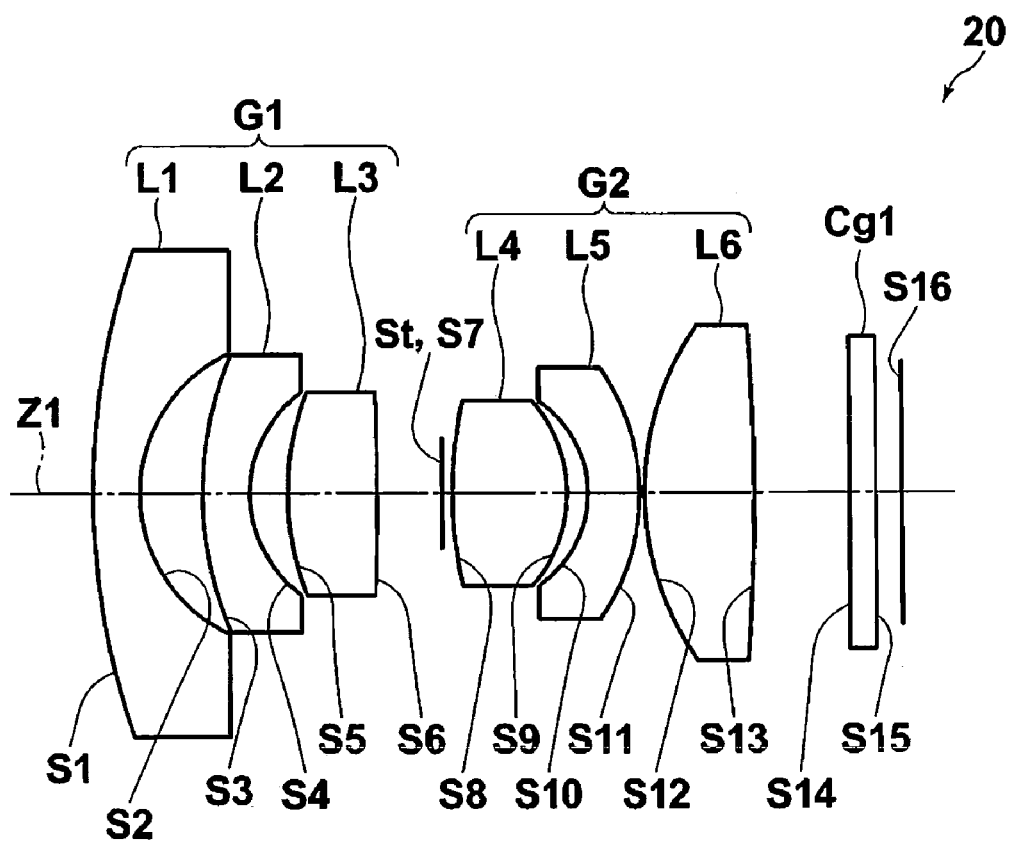
FIG. 7 is a sectional view showing the schematic configuration of an imaging lens of Example 6.
Figure 8:
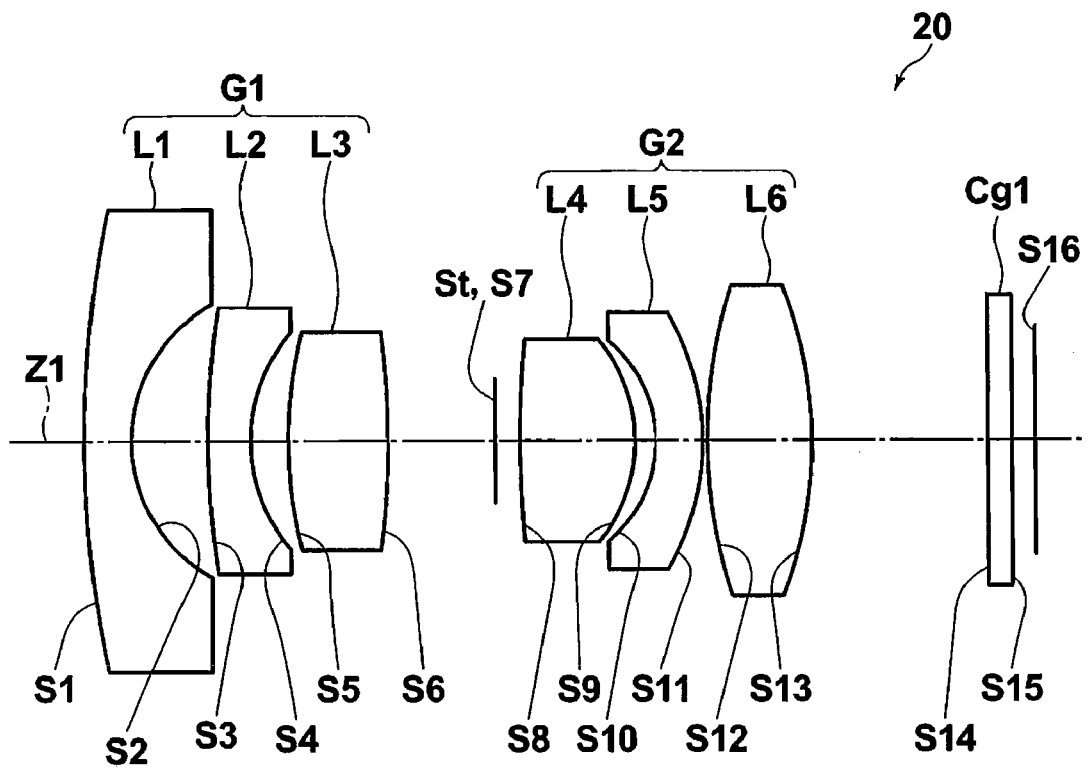
FIG. 8 is a sectional view showing the schematic configuration of an imaging lens of Example 7.
Figure 9:
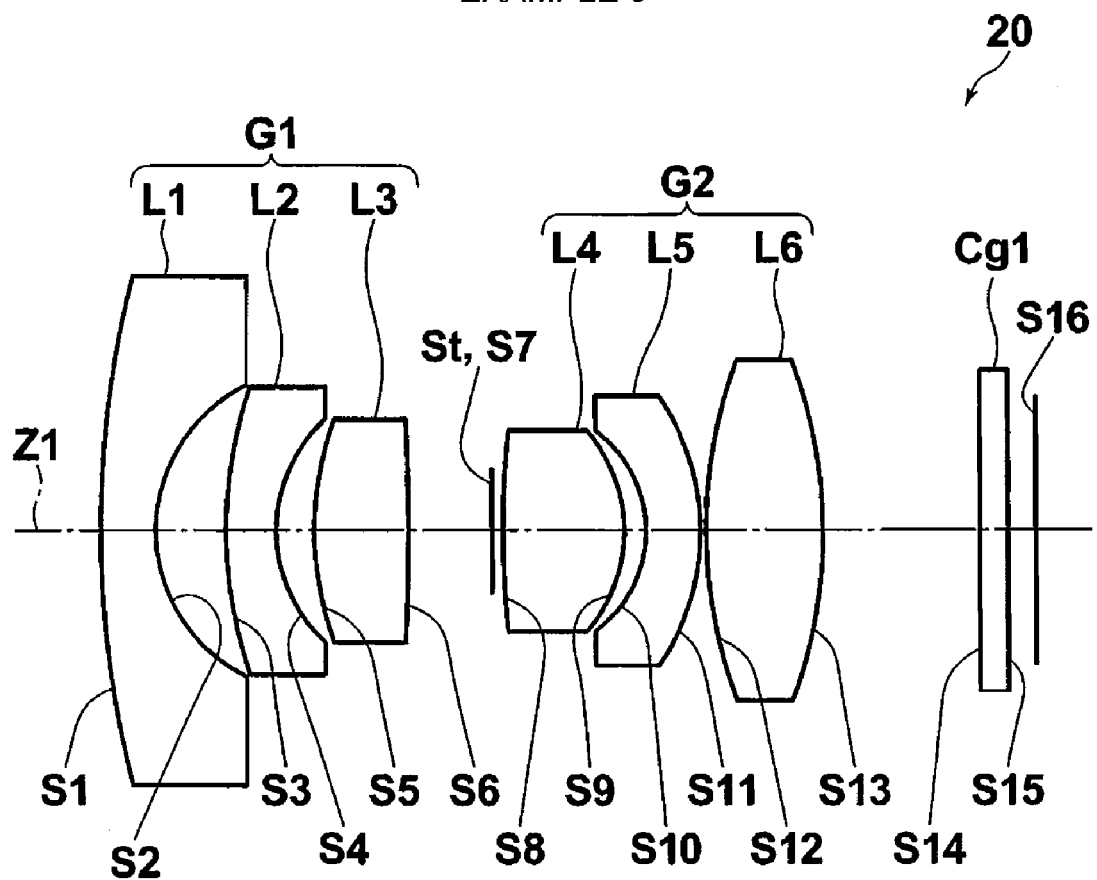
FIG. 9 is a sectional view showing the schematic configuration of an imaging lens of Example 8.
Figure 10:
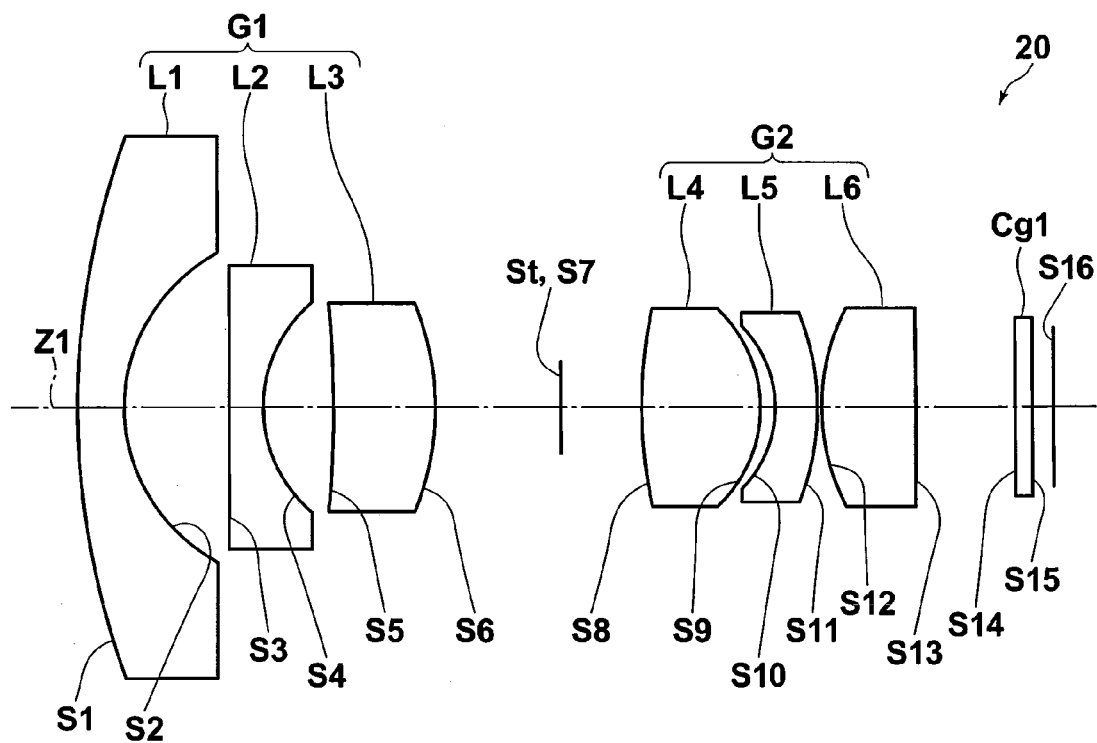
FIG. 10 is a sectional view showing the schematic configuration of an imaging lens of Example 9.
Figure 11:
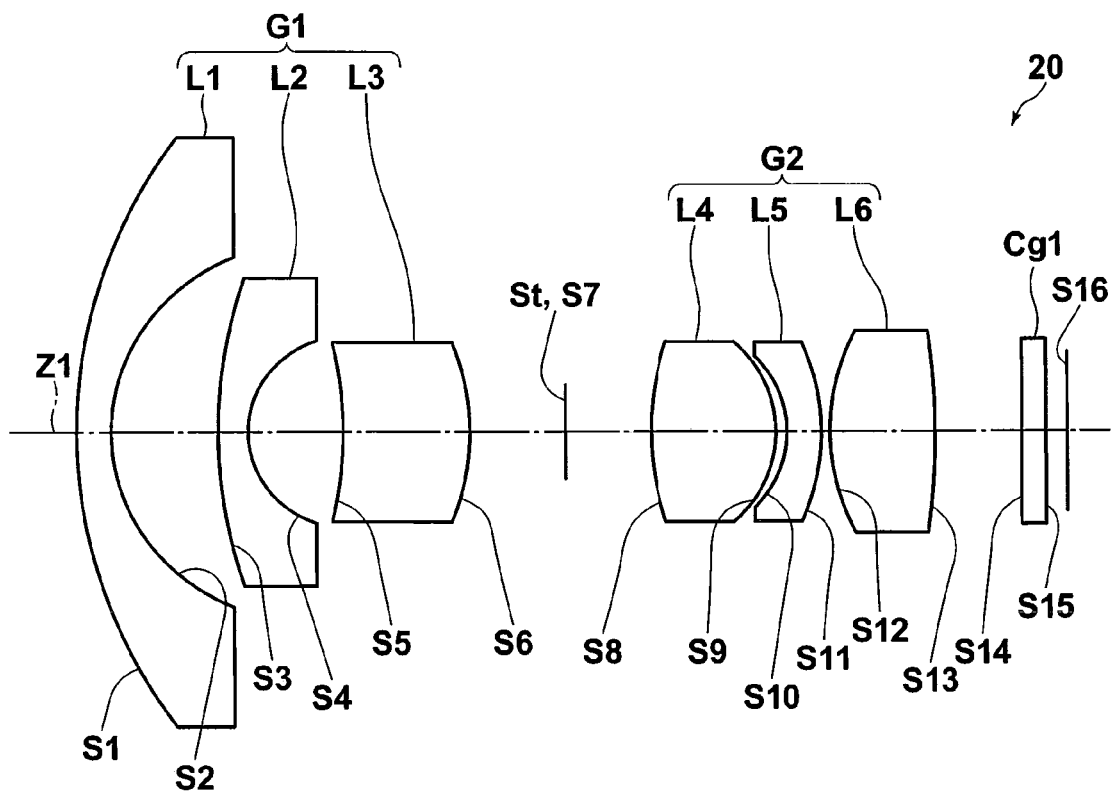
FIG. 11 is a sectional view showing the schematic configuration of an imaging lens.
Figure 14:
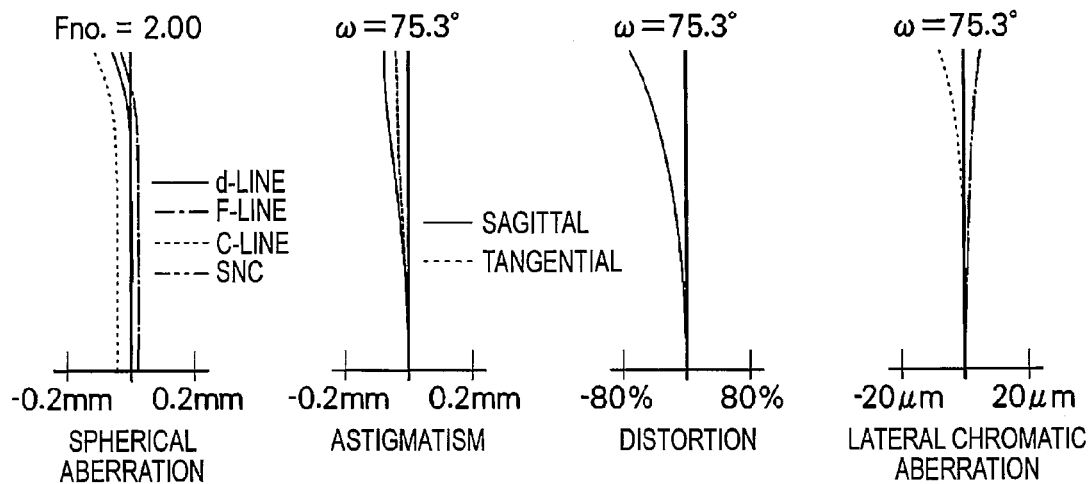
FIG. 14 is a diagram showing aberrations of the imaging lens of Example 3.
Figure 15:
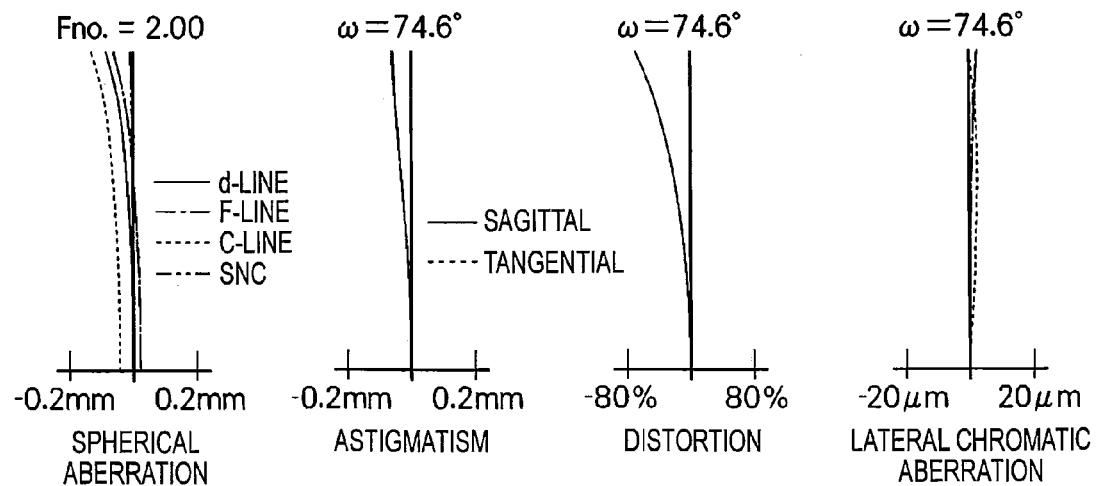
FIG. 15 is a diagram showing aberrations of the imaging lens of Example 4.
Figure 20:
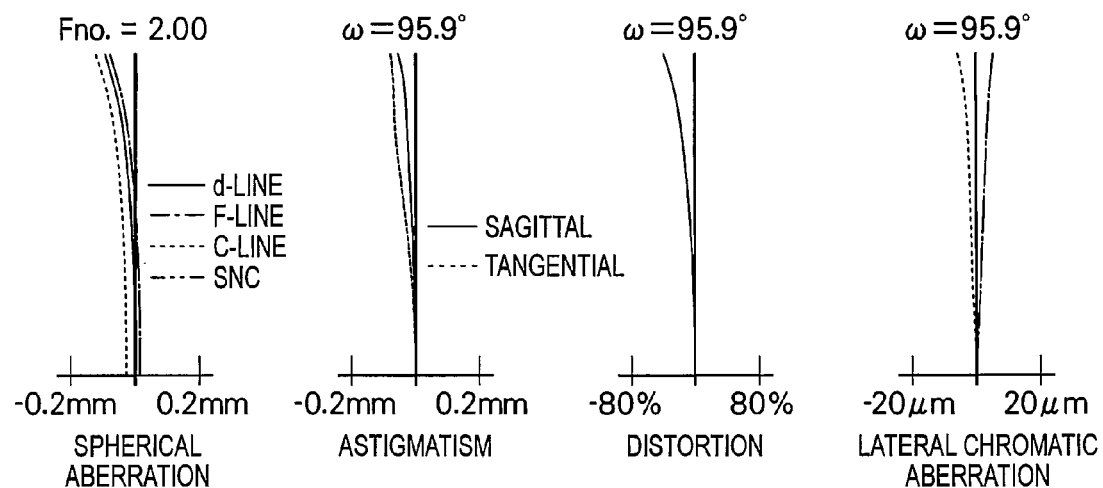
FIG. 20 is a diagram showing aberrations of the imaging lens of Example 9.
Figure 21:
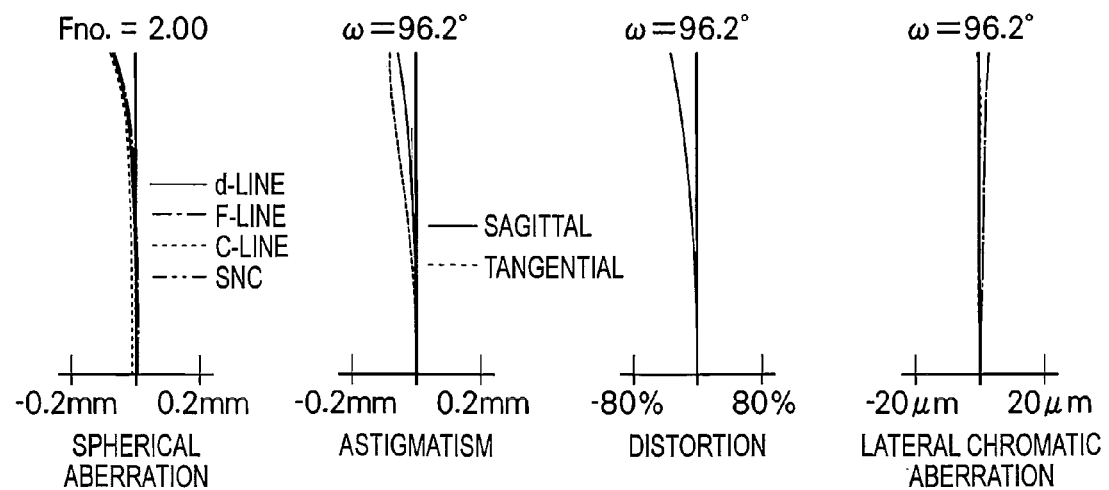
FIG. 21 is a diagram showing aberrations of the imaging lens of Example 10.

An imaging lens or an imaging apparatus according to the first or third aspect of the invention includes, in order from the object side, the front group having a negative power, the stop, and the rear group having a positive power. The front group includes, in order from the object side, the first negative lens having a concave surface on the image side, the second negative lens where the object-side lens surface thereof has the radius of curvature whose absolute value is larger than that of the image-side lens surface thereof, and the third positive lens. The rear group includes, in order from the object side, the fourth positive lens, the fifth negative lens having a meniscus shape with a concave surface on the object side, and the sixth positive lens. The Abbe number of each of the first lens, the second lens, the fourth lens, and the sixth lens at the d-line is equal to or larger than 40, and the Abbe number of each of the third lens and the fifth lens at the d-line is equal to or smaller than 40. Each lens constituting the front group and the rear group is a single lens. Therefore, environmental resistance can be improved without deteriorating lens performance or without causing an increase in manufacturing costs.

Specifically, with an imaging lens or an imaging apparatus according to the first or third aspect of the invention, the following advantages can be obtained.

That is, each lens constituting the front group and the rear group is a single lens, and no cemented lens is used. For this reason, no special processing for lens cementation is needed, and occurrence of a problem due to lens cementation is suppressed. Therefore, environmental resistance can be improved without deteriorating lens performance or without causing an increase in manufacturing costs.

The first lens and the second lens nearest to the object side in the imaging lens have negative power, which makes it easy to increase an angle of view in the imaging lens. The first lens is a lens having a concave surface on the image side, and the second lens is a negative lens where an object-side lens surface thereof has a radius of curvature whose absolute value is larger than that of an image-side lens surface thereof. In this way, entrance rays at a wide angle of view larger than 130° can be captured.

The Abbe number of each of the first lens and the second lens at the d-line is equal to or larger than 40, so occurrence of chromatic aberration can be suppressed while an angle of view in an imaging lens can be increased.

The third lens is a positive lens, so the field curvature can be satisfactorily corrected. The Abbe number of the third lens at the d-line is equal to or smaller than 40, so lateral chromatic aberration can be satisfactorily corrected.

The fourth lens is a positive lens, the fifth lens is a negative lens, the Abbe number of the fourth lens at the d-line is equal to or larger than 40, and the Abbe number of the fifth lens at the d-line is equal to or smaller than 40. Therefore, longitudinal chromatic aberration and lateral chromatic aberration can be satisfactorily corrected.

The fifth lens is a negative meniscus lens having a concave surface on the object side, so field curvature can be satisfactorily corrected.

The sixth lens is a lens having positive power, so the entrance angle of marginal rays to the imaging surface of the imaging lens can be made small. Therefore, a lens having good telecentricity can be realized.

An imaging lens or an imaging apparatus according to the second or fourth aspect of the invention includes, in order from the object side, the front group having negative power, the stop, and the rear group having positive power. The front group includes, in order from the object side, the first negative lens having a concave surface on the image side, the second negative lens, and the third positive lens. The rear group includes two positive lenses and one negative lens. The Abbe number of each of the first lens and the second lens at the d-line is equal to or larger than 45, and the Abbe number of the third lens at the d-line is equal to or smaller than 25. The Abbe number of one negative lens constituting the rear group at the d-line is equal to or smaller than 25, and the Abbe number of each of the two positive lenses at the d-line is equal to or larger than 45. Each lens constituting the front group and the rear group is a single lens. The distance from the object-side lens surface of the first lens to the imaging surface of the imaging lens is equal to or smaller than 18 mm. Therefore, environmental resistance can be improved without deteriorating lens performance or without causing an increase in manufacturing costs.

Specifically, with an imaging lens or an imaging apparatus according to the second or fourth aspect of the invention, the following advantages can be obtained.

That is, each lens constituting the front group and the rear group is a single lens, and no cemented lens is used. For this reason, no special processing for lens cementation is needed, and occurrence of a problem due to lens cementation is suppressed. Therefore, environmental resistance can be improved without deteriorating lens performance or without causing an increase in manufacturing costs. Each lens constituting the front group and the rear group is a single lens, so degeneration or modification at the cemented surface due to physical and chemical stimuli can be suppressed. As a result, environmental resistance can be further improved.

The first lens L1 and the second lens L2 are lenses having negative power, so a wide-angle imaging lens is easily realized. The first lens is a lens having a concave surface on the image side, and the second lens is a negative lens. Therefore, entrance rays at a wide angle of view larger than 130° can be captured. Further, when the second lens is a negative meniscus lens having a convex surface on the object side, it is possible to easily increase an angle of view in the lens radius while suppressing distortion.

The third lens is a positive lens, so the field curvature can be satisfactorily corrected.

The two positive lenses and one negative lens are arranged at the back of the stop, so field curvature and spherical aberration can be satisfactorily corrected.

The Abbe number of the lens having negative power of the front group at the d-line is equal to or larger than 45, so occurrence of chromatic aberration can be suppressed while an angle of view in an imaging lens can be increased.

The Abbe number of the lens having positive power of the front group at the d-line is equal to or smaller than 25, so lateral chromatic aberration can be satisfactorily corrected.

The Abbe number of the lens having negative power of the front group at the d-line is equal to or smaller than 25, and the Abbe number of the lens having positive power of the rear group at the d-line is equal to or larger than 45, so longitudinal chromatic aberration and lateral chromatic aberration can be satisfactorily corrected.

The distance from the object-side lens surface of the first lens to the imaging surface is equal to or smaller than 18 mm, so an imaging lens can be reduced in size.

Hereinafter, an exemplary embodiment of the invention will be described with reference to the drawings. FIG. 1 is a sectional view showing the schematic configuration of an embodiment of an imaging lens of the invention and an imaging apparatus using the imaging lens.

An imaging apparatus 100 shown in FIG. 1 is applied to an onboard camera or the like for photographing the front side, the lateral side, and the rear side of an automobile. The imaging apparatus 100 includes an imaging device 10 having a CCD or a CMOS, and an imaging lens 20.

The imaging lens 20 forms an optical image of a subject on the light receiving surface Jk of the imaging device 10. The imaging device 10 converts the optical image of the subject formed on the light receiving surface Jk by the imaging lens 20 and outputs an image signal representing the optical image.

<Basic Configuration of Imaging Lens, and Operation and Advantage Thereof>

First, two types of basic configuration of the imaging lens 20, a first basic configuration and a second basic configuration, will be described.

The imaging lens 20 having the following first basic configuration includes, in order from an object side along an optical axis Z1 (in the drawing, the −Z direction side), a front group G1 having negative power, an aperture diaphragm St as an exemplary embodiment of a stop, and a rear group G2 having positive power.

The front group G1 includes, in order from the object side, a first negative lens L1 having a meniscus shape with a concave surface on an image side (in the drawing, the +Z direction side), a second negative lens L2 where an object-side lens surface thereof has a radius of curvature whose absolute value is larger than that of an image-side lens surface thereof, and a third positive lens L3.

The rear group G2 includes, in order from the object side, a fourth positive lens L4, a fifth negative lens L5 having a meniscus shape with a concave surface on the object side, and a sixth positive lens L6.

An Abbe number of each of the first lens L1, the second lens L2, the fourth lens L4, and the sixth lens L6 at the d-line is equal to or larger than 40, and an Abbe number of each of the third lens L3 and the fifth lens L5 at the d-line is equal to or smaller than 40.

Each lens constituting the front group G1 and the rear group G2 is a single lens.

The imaging lens 20 having the following second basic configuration includes, in order from the object side, a front group G1 having negative power, an aperture diaphragm St, and a rear group G2 having positive power.

The front group G1 includes, in order from the object side, a first negative lens L1 having a meniscus shape with a concave surface on the image side, a second negative lens L2 having a meniscus shape where an object-side lens surface thereof has a radius of curvature whose absolute value is larger than that of an image-side lens surface thereof, and a third positive lens L3.

The rear group G2 includes two positive lenses and one negative lens.

An Abbe number of each of the first lens L1 and the second lens L2 at the d-line is equal to or larger than 45, and an Abbe number of the third lens L3 at the d-line is equal to or smaller than 25. An Abbe number of one negative lens constituting the rear group G2 at the d-line is equal to or smaller than 25, and an Abbe number of each of the two positive lenses constituting the rear group at the d-line is equal to or larger than 45.

A distance from an object-side lens surface S1 of the first lens L1 to the imaging surface S16 of the imaging lens 20 is preferably equal to or smaller than 21 mm, more preferably equal to or smaller than 18 mm.

The light receiving surface Jk of the imaging device 10 is arranged on the imaging surface S16 on which the optical image representing the subject is formed through the imaging lens 20, as described above.

In any of the first and second configuration, the imaging lens 20 may include a flat plate-shaped optical member CG1, such as an infrared cut filter or cover glass for protecting the light receiving surface Jk, between the rear group G2 and the imaging device 10. The optical member CG1 selected depending on the specification of the imaging apparatus 100 is arranged.

In FIG. 1, reference numerals S1 to S16 indicate the following configuration.

Reference numerals S1 and S2 respectively indicate an object-side (in the drawing, the −Z side) lens surface and an image-side (in the drawing, the +Z side) lens surface of the first lens L1. Reference numerals S3 and S4 respectively indicate an object-side lens surface and an image-side lens surface of the second lens L2. Reference numerals S5 and S6 respectively indicate an object-side lens surface and an image-side lens surface of the third lens L3. Reference numeral S7 indicates an opening of the aperture diaphragm St. Reference numerals S8 and S9 respectively indicate an object-side lens surface and an image-side lens surface of the fourth lens L4. Reference numerals S10 and S11 respectively indicate an object-side lens surface and an image-side lens surface of the fifth lens L5. Reference numerals S12 and S13 respectively indicate an object-side lens surface and an image-side lens surface of the sixth lens L6. Reference numerals S14 and S15 respectively indicate an object-side surface and an image-side surface of the optical member CG1. Reference numeral S16 indicates the imaging surface of the imaging lens 20 which matches the light receiving surface Jk of the imaging device 10, as described above.

Reference numeral Sk1 indicates a light shielding plate arranged on the surface of the first lens L1 on the image side, and reference numeral Sk2 indicates a light shielding plate arranged on the image-side surface of the second lens L2. A symbol 2ω indicates a full angle of view of the imaging lens 20.

The imaging lens 20 may satisfy any one of the first basic configuration and the second basic configuration.

<Additional Configuration to First Basic Configuration or Second Basic Configuration, and Operation and Advantage Thereof>

Next, additional configuration to the first basic configuration or the second basic configuration of the imaging lens 20, and the operation and advantage thereof will be described.

The imaging lens 20 of this embodiment may satisfy any one of a plurality of additional configuration to the first basic configuration or the second basic configuration, or may satisfy a combination of at least two of a plurality of additional configuration to the first basic configuration or the second basic configuration.

The meanings of parameters indicated by symbols in the conditional expressions (1) to (13) representing the additional configuration to the basic configuration of the imaging lens will be described below. The meanings of parameters having already been described will also be described below.

f: a focal length of the imaging lens f12: a composite focal length of the first lens and the second lens f123: a composite focal length of the front group G1 f456: a composite focal length of the rear group G2 f45: a composite focal length of two adjacent lenses nearest to the object side of the rear group G2

R9: a radius of curvature of the lens surface S9 of the fourth lens L4 nearest to the object side of the rear group G2

R10: a radius of curvature of the object-side lens surface S10 of the fifth lens L5 adjacent to the image side of the fourth lens L4 of the rear group nearest to the object side L: a distance from the object-side lens surface S1 of the first lens L1 to the imaging surface S16 of the imaging lens (the light receiving surface Jk of the imaging device 10) (back focus part is air-converted)

Bf: a back focal length (an air-converted distance (air-converted length) from the image-side lens surface S13 of the sixth lens L6 to the imaging surface S16)

Nd1: a refractive index of a material forming the first lens L1 at the d-line

Nd3: a refractive index of a material forming the third lens L3 at the d-line

Nd5: a refractive index of a material forming the fifth lens L5 at the d-line

IH: a maximum image height

ν1: an Abbe number of a material forming the first lens L1 at the d-line

ν2: an Abbe number of a material forming the second lens L2 at the d-line

ν3: an Abbe number of a material forming the third lens L3 at the d-line

ν4: an Abbe number of a material forming the fourth lens L4 at the d-line

ν5: an Abbe number of a material forming the fifth lens L5 at the d-line

ν6: an Abbe number of a material forming the sixth lens L6 at the d-line

D1: a thickness of the first lens L1 on the optical axis (hereinafter, also referred to as center thickness)

D8: a center thickness of the fourth lens L4

D9: a space (air space) between the fourth lens L4 and the fifth lens L5

Reference numerals f1 to f6 respectively indicate the focal lengths of the first lens L1 to the sixth lens L6.

The third lens L3 is preferably a biconvex lens. If the third lens L3 has a biconvex shape, the third lens L3 can have strong positive power, such that field curvature and lateral chromatic aberration are easily corrected.

The third lens L3 preferably has a biconvex shape where the radius of curvature of the object-side lens surface S5 thereof has a radius of curvature whose absolute value is smaller than that of the image-side lens surface S6 thereof. With this third lens L3, field curvature is further easily corrected.

The two positive lenses of the rear group G2 are preferably biconvex lenses. If the two lenses having positive power of the rear group G2 have a biconvex shape, chromatic aberration can be satisfactorily corrected while telecentricity can be ensured.

A lens of the rear group G2 nearest to the object side, in this case, the fourth lens L4, is preferably a biconvex lens. If the fourth lens L4 has a biconvex shape, the fourth lens L4 can have strong positive power, and chromatic aberration can be satisfactorily corrected in combination with the fifth lens L5.

A lens of the rear group G2 nearest to the image side, in this case, the sixth lens L6, is preferably a biconvex lens. If the sixth lens L6 has a biconvex shape, the sixth lens L6 can have strong positive power, and thus satisfactory telecentricity can be easily obtained.

The sixth lens L6 is preferably a biconvex lens where the object-side lens surface S12 thereof has a radius of curvature whose absolute value is smaller than that of the image-side lens surface S13 thereof. Thus, spherical aberration can be satisfactorily corrected.

The second lens L2 is preferably a plano-concave lens where the object-side lens surface S3 thereof has a planar shape, or a meniscus lens having negative power where the object-side lens surface S3 thereof has a radius of curvature whose absolute value is larger than that of the image-side lens surface S4 thereof. With this second lens L2, the second lens L2 can have strong negative power, so it is advantageous to increase an angle of view.

A lens next to a lens of the rear group G2 nearest to the object side, in this case, the fifth lens L5, is preferably a meniscus lens having a concave surface on the object side. With this fifth lens L5, field curvature can be satisfactorily corrected.

The radius of curvature of an image-side lens surface of a lens of the rear group G2 nearest to the object side, in this case, the radius of curvature R9 of the lens surface S9 of the fourth lens L4, and the radius of curvature of an object-side lens surface of a lens adjacent to the fourth lens L4 serving as a lens next to a lens of the rear group G2 nearest to the object side, in this case, the radius of curvature R10 of the lens surface S10 of the fifth lens L5 preferably satisfy the following conditional expression (1): 0.5<R10/R9<1.0.

However, if the value R10/R9 is equal to or larger than the upper limit of the conditional expression (1), R9 becomes excessively small, which makes it difficult to ensure the edge of the fourth lens. Meanwhile, R10 becomes excessively large and power of the fifth lens is weakened, which makes it difficult to correct chromatic aberration. If the value R10/R9 is equal to or smaller than the lower limit of the conditional expression (1), R10 becomes excessively small, so processing becomes difficult.

The following conditional expression (2): 0.8<|f12/f|<1.8 relates to an increase in an angle of view or field curvature. If an imaging lens is configured so as to satisfy the conditional expression (2), an angle of view can be increased while an increase in the size of the lens can be suppressed. Field curvature can also be suppressed.

However, if the value f12/f is equal to or larger than the upper limit of the conditional expression (2), it is difficult to increase an angle of view while suppressing an increase in the size of the lens. If the value f12/f is equal to or smaller than the lower limit of the conditional expression (2), an increase in an angle of view can be easily achieved, but field curvature becomes large, which makes it difficult to obtain a satisfactory image.

Note that |f12/f| means the absolute value of the value f12/f.

It is preferable that the lens system is configured so as to satisfy the following conditional expression (2'): 0.8<|f12/f|<1.5. If the imaging system is configured so as to satisfy the upper limit of the conditional expression (2'), an angle of view can be more easily increased while an increase in the size of the lens can be suppressed.

The following conditional expression (3): 1.0<|f123/f456|<2.2 relates to an increase in an angle of view or field curvature. If an imaging lens is configured so as to satisfy the conditional expression (3), an angle of view can be increased while an increase in the size of the lens can be suppressed. Field curvature can also be suppressed.

However, if the value |f123/f456| is equal to or larger than the upper limit of the conditional expression (3), it is difficult to increase an angle of view while suppressing an increase in the size of the lens. If the value |f123/f456| is equal to or smaller than the lower limit of the conditional expression (3), it is difficult to satisfactorily correct field curvature.

The following conditional expression (4): 5<L/f<18 relates to the size of the imaging lens or an increase in an angle of view. If an imaging lens is configured so as to satisfy the conditional expression (4), an angle of view can be increased while the increase in the size of the imaging lens can be suppressed.

However, if the value L/f is equal to or larger than the upper limit of the conditional expression (4), the lens is increased in size. If the value L/f is equal to or smaller than the lower limit of the conditional expression (4), it is difficult to increase an angle of view.

In order to reduce the size of the imaging lens, the distance L is preferably equal to or smaller than 22 mm. If the distance L is equal to or smaller than 18 mm, reduction in size can be achieved. If the distance L is equal to or smaller than 16 mm, further reduction in size can be achieved.

It is preferable that the lens system is configured so as to satisfy the upper limit of the following conditional expression (4'): 5<L/f<13. If the imaging system is configured so as to satisfy the conditional expression (4'), the size of the imaging lens can be more easily reduced.

The full angle of view 2ω of the imaging lens 20 is preferably equal to or larger than 130°. If the full angle of view 2ω is equal to or larger than 130°, the imaging lens 20 can have performance suitable for an onboard camera or a surveillance camera.

The following conditional expression (5): 0.8<Bf/f<3.0 relates to the magnitude of the back focal length. If an imaging lens is configured so as to satisfy the conditional expression (5), the magnitude of the back focal length can be appropriately set.

However, if the value Bf/f is equal to or larger than the upper limit of the conditional expression (5), the back focal length becomes excessively large and the imaging lens increases in size. If the value Bf/f is equal to or smaller than the lower limit of the conditional expression (5), the back focal length becomes excessively small, which makes it difficult to insert cover glass or various filters between the imaging lens and the imaging device.

In order to insert cover glass or various filters between the imaging lens and the imaging device, the back focal length Bf is preferably equal to or larger than 2.5 mm.

The following conditional expression (6): $2.0<f45/f<6.5$ relates to chromatic aberration or field curvature. If an imaging lens is configured so as to satisfy the conditional expression (6), chromatic aberration and field curvature can be satisfactorily corrected.

However, if the value $f45/f$ is equal to or larger than the upper limit of the conditional expression (6), it is difficult to correct chromatic aberration. If the value $f45/f$ is equal to or smaller than the lower limit of the conditional expression (6), it is difficult to satisfactorily correct field curvature.

It is preferable that the lens system is configured so as to satisfy the upper limit of the following conditional expression (6'): $2.0<f45/f<5.2$. If the lens system is configured so as to satisfy the conditional expression (6'), chromatic aberration can be more easily corrected.

The following conditional expression (7): $0.5<f1/f2<2.8$ relates to comatic aberration or distortion. If an imaging lens is configured so as to satisfy the conditional expression (7), comatic aberration and distortion can be satisfactorily corrected.

However, if the value $f1/f2$ is equal to or larger than the upper limit of the conditional expression (7), it is difficult to satisfactorily correct comatic aberration. If the value $f1/f2$ is equal to or smaller than the lower limit of the conditional expression (7), the radius of curvature of the image-side lens surface S2 of the first lens L1 becomes excessively small, so processing becomes difficult. Further, power of the first lens L1 becomes excessively strong, which makes it difficult to correct distortion due to rapid bending of marginal rays.

It is preferable that the lens system is configured so as to satisfy the following conditional expression (7'): $0.5<f1/f2<2.5$. If the lens system is configured so as to satisfy the upper limit of the conditional expression (7'), comatic aberration can be more easily corrected.

The following conditional expression (8): $2.0<f3/f<10.0$ relates to field curvature or assembling workability. If an imaging lens is configured so as to satisfy the conditional expression (8), good assembling workability can be obtained while field curvature can be suppressed.

However, if the value $f3/f$ is equal to or larger than the upper limit of the conditional expression (8), it is difficult to satisfactorily correct field curvature. If the value $f3/f$ is equal to or smaller than the lower limit of the conditional expression (8), power of the third lens L3 becomes excessively strong and a change in performances due to decentering becomes significant, which causes a decrease in the tolerance of a manufacturing error and an assembling error. For this reason, assembling becomes difficult and there is an increase in costs.

It is preferable that the lens system is configured so as to satisfy the following conditional expression (8'): $2.0<f3/f<4.7$. If the lens system is configured so as to satisfy the upper limit of the conditional expression (8'), field curvature can be more easily corrected.

The following conditional expression (9): $2.0<|f6/f|<5.8$ relates to telecentricity or assembling workability. If an imaging lens is configured so as to satisfy the conditional expression (9), good telecentricity and assembling workability can be obtained.

However, if the value $|f6/f|$ is equal to or larger than the upper limit of the conditional expression (9), the entrance angle of marginal rays to the imaging surface increases, which makes it difficult to manufacture a lens having good telecentricity. If the value $|f6/f|$ is equal to or smaller than the lower limit of the conditional expression (9), power of the sixth lens L6 becomes excessively strong and the sixth lens L6 is too sensitive to decentering, which makes it difficult to assemble an imaging lens.

It is preferable that the lens system is configured so as to satisfy the following conditional expression (9'): $2.0<|f6/f|<4.5$. If the lens system is configured so as to satisfy the upper limit of the conditional expression (9'), the entrance angle of marginal rays to the imaging surface can be more easily reduced.

The following conditional expression (10): $0.40<D1/f$ relates to physical strength of the first lens L1. If an imaging lens is configured so as to satisfy the conditional expression (10), when the imaging lens is applied to an onboard camera or the like, desired impact resistance can be obtained with respect to the first lens L1.

However, if the value $D1/f$ is equal to or smaller than the lower limit of the conditional expression (10), the first lens becomes thin, which makes it difficult to obtain desired impact resistance.

The following conditional expression (11): $0.80<D8/f<2.40$ relates to the size of the imaging lens or assembling workability. If an imaging lens is configured so as to satisfy the conditional expression (11), good assembling workability can be obtained while an increase in the size of the imaging lens can be suppressed.

However, if the value $D8/f$ is equal to or larger than the upper limit of the conditional expression (11), a lens of the rear group nearest to the object side, in this case, the fourth lens L4, is increased in size, which makes it difficult to achieve reduction in size. If the value $D8/f$ is equal to or smaller than the lower limit of the conditional expression (11), a lens of the rear group nearest to the object side becomes excessively thin, which makes it impossible to ensure the edge. For this reason, it is difficult to assemble the imaging lens.

It is preferable that the lens system is configured so as to satisfy the following conditional expression (11'): $0.80<D8/f<1.80$. If the lens system is configured so as to satisfy the upper limit of the conditional expression (11'), the size of the imaging lens can be more easily reduced.

The following conditional expression (12): $0.10<D9/f<1.00$ relates to the size of the imaging lens, chromatic aberration, or ray vignetting. If an imaging lens is configured so as to satisfy the conditional expression (12), chromatic aberration can be corrected without causing an increase in the size of the imaging lens or without causing ray vignetting.

However, if the value $D9/f$ is equal to or larger than the upper limit of the conditional expression (12), a space between the fourth lens L4 of the rear group nearest to the object side and the fifth lens L5 next to the fourth lens L4 from the object side increases, which causes an increase in the size of the imaging lens and makes it difficult to correct chromatic aberration. If the value $D9/f$ is equal to or smaller than the lower limit of the conditional expression (12), a space between the fourth lens L4 of the rear group nearest to the object side and the fifth lens L5 next to the fourth lens L4 from the object side becomes excessively small, which brings the fourth lens and the fifth lens into contact with each other at the edge. For this reason, the lens is likely to be chipped, and vignetting occurs in the entrance rays from the margin when a spacer ring is inserted.

The following conditional expression (13): $2.0<f6/IH<4.0$ relates to telecentricity or assembling workability. If an imaging lens is configured so as to satisfy the conditional expression (13), good telecentricity and assembling workability can be obtained.

However, if the value f6/IH is equal to or larger than the upper limit of the conditional expression (13), the entrance angle of rays from the margin to the imaging surface increases, which makes it difficult to manufacture a lens having good telecentricity. If the value f6/IH is equal to or smaller than the lower limit of the conditional expression (13), power of the sixth lens L6 becomes excessively strong and a change in performances due to decentering becomes significant, which causes a decrease in the tolerance of a manufacturing error and an assembling error. For this reason, assembling becomes difficult and there is an increase in costs.

Each lens constituting the front group G1 and the rear group G2 is preferably a glass lens. If each lens constituting the front group and the rear group is a glass lens, even though an imaging lens is used under a severe environment, an out-of-focus can be suppressed.

When the imaging lens of this embodiment is applied to, for example, an imaging lens of an onboard camera or a surveillance camera, materials constituting the imaging lens are preferably glass since the imaging lens is used in a wide temperature range.

The refractive index Nd1 of a material forming the first lens L1 at the d-line is preferably equal to or larger than 1.7.

When the refractive index Nd1 is smaller than 1.7, it is difficult to process the concave shape of the lens surface S2 as the rear surface of the first lens L1 deep such that the first lens L1 has strong power. Further, it is difficult to suppress distortion, such as reduction of an image in the marginal portion.

The refractive index Nd3 of a lens material forming the third lens L3 at the d-line is preferably equal to or larger than 1.8.

If the refractive index Nd3 of the lens material forming the third lens L3 at the d-line is equal to or larger than 1.8, power of the third lens easily becomes strong, and as the lens material, a material having a small Abbe number can be selected. For this reason, it is advantageous to correct lateral chromatic aberration. Further, it becomes easy to ensure the edge of the third lens.

The Abbe number ν3 of a lens material forming the third lens L3 at the d-line is preferably equal to or smaller than 40.

If the Abbe number ν3 of the lens material forming the third lens L3 at the d-line is equal to or smaller than 40, lateral chromatic aberration can be satisfactorily corrected.

If the Abbe number ν3 of the lens material forming the third lens L3 at the d-line is equal to or smaller than 25, lateral chromatic aberration can be further satisfactorily corrected.

The refractive index Nd5 of a lens material forming a second lens of the rear group G2 when counted from the object side, in this case, the fifth lens L5, at the d-line is preferably equal to or larger than 1.8.

The Abbe number ν1 of a lens material forming the first lens L1 at the d-line is preferably equal to or smaller than 75.

If the Abbe number ν1 of the lens material is larger than 75, there is an increase in material costs, which makes it difficult to provide an imaging lens at low cost.

The Abbe number ν1 of the lens material of the first lens L1 may be equal to or smaller than 70.

The Abbe number ν2 of a lens material forming the second lens L2 at the d-line is preferably equal to or smaller than 75.

If the Abbe number ν2 of this lens material is larger than 75, there is an increase in material costs, which makes it difficult to provide an imaging lens at low cost.

The Abbe number ν2 of this lens material may be equal to or smaller than 70.

The Abbe number ν4 of a lens material forming a lens of the rear group G2 nearest to the object side, in this case, the fourth lens L4, at the d-line is preferably equal to or smaller than 75.

If the Abbe number ν4 of this lens material is larger than 75, there is an increase in material costs, which makes it difficult to provide an imaging lens at low cost.

The Abbe number ν4 of this lens material may be equal to or smaller than 70.

The Abbe number ν6 of a lens material forming a lens of the rear group G2 nearest to the image side, in this case, the sixth lens L6, at the d-line is preferably equal to or smaller than 75.

If the Abbe number ν6 of this lens material is larger than 75, there is an increase in material costs, which makes it difficult to provide an imaging lens at low cost.

The Abbe number ν6 of this lens material may be equal to or smaller than 70.

The second lens may be a biconcave lens. If the second lens is a biconcave lens, an angle of view can be more easily increased.

The third lens may be a meniscus lens having a concave surface on the object side or a plano-concave lens. If the third lens is a meniscus lens having a concave surface on the object side, it is possible to satisfactorily correct field curvature and comatic aberration and a lens having a wider angle of view such as more than 180° can be easily manufactured.

When the imaging lens 20 is used under a severe environment, such as an onboard camera or the like, the first lens L1 arranged nearest to the object side is preferably made of a material tolerant of surface deterioration due to weather and a change in temperature due to direct sunlight, tolerant of chemical agents, such as fat and oil, detergent, and the like, and having high water resistance, weather resistance, acid resistance, chemical resistance, and the like. The first lens L1 arranged nearest to the object side is preferably made of a rigid and splinterless material.

As described above, the first lens L1 is preferably made of glass, but it may be made of transparent ceramics. Ceramics has strength and heat resistance higher than typical glass.

The center thickness D1 of the first lens L1 is preferably equal to or larger than 0.8 mm. If the center thickness D1 of the first lens L1 is equal to or larger than 0.8 mm, the first lens L1 can be made splinterless.

As described above, when the imaging lens 20 is applied to an onboard camera, the imaging lens needs to be usable in a wide temperature range including outdoor air of a cold area and the inside of an automobile in summer of a tropical area. When the imaging lens is used in a wide temperature range, as the lens material, a material having a small linear coefficient of expansion is preferably used. When the imaging lens is applied to an onboard camera or the like and needs to be usable in a wide temperature range, all lenses are preferably glass lenses.

In order to prevent the inside of the lens from being fogged due to a severe change in temperature and humidity, the first lens may have a waterproof structure so as to block entrance of air or moisture from the external environment. The waterproof structure may be a sealed structure in which the first lens L1 and a lens frame housing the first lens L1 are adhered to each other, or a sealed structure in which an O ring is inserted between the first lens L1 and the lens frame.

When the imaging lens is used under a severe temperature environment and humidity environment, the imaging lens preferably has no cemented lens. The imaging lens of this embodiment is configured such that all lenses are single lenses, and no cemented lens is used in the entire imaging lens.

In order to provide a low-cost imaging lens, all lenses are preferably spherical lenses. Alternatively, in order to satisfactorily correct aberrations in terms of performance or the like, aspheric lenses may be used. In order to correctly form an aspheric surface at low cost, plastic may be used as the lens material.

Light rays passing through out of the effective diameter between the lenses reach the imaging surface as stray light and become a ghost image. For this reason, if necessary, it is preferable to provide light shielding means for shielding stray light. As the light shielding means, for example, a nontransparent coating material may be applied or a nontransparent plate member (for example, the light shielding plates Sk1 and Sk2 shown in FIG. 1) may be provided at a portion out of the effective diameter on the image side of the lens. Further, a nontransparent plate member may be provided as the light shielding means in the optical path of the light rays that become stray light. Alternatively, a hood for shielding stray light may be further arranged on the object side of the lens nearest to the object side. For example, although FIG. 1 shows an example where the light shielding means Sk1 and Sk2 are respectively provided on the image-side lens surface S2 of the first lens L1 and the image-side lens surface S4 of the second lens L2, a location where a light shielding means is provided is not limited to the locations shown in FIG. 1. Light shielding means may be arranged on a different lens or between the lenses.

A different stop from an aperture diaphragm may be arranged between the lenses so as to shield marginal rays. The marginal rays are rays passing through a marginal portion in an entrance pupil of the imaging lens as off-axis light rays. The marginal rays are shielded such that relative illumination is within a range with no practical problems, so the image quality of the marginal portion of the imaging surface S16 can be improved. Further, the marginal rays are shielded, that is, light causing a ghost image is shielded, so the ghost image is unnoticeable.

The different stop for shielding marginal rays such that relative illumination is within a range with no practical problems is preferably arranged between the aperture diaphragm and the fourth lens.

Also, the different stop for shielding marginal rays such that relative illumination is within a range with no practical problems is preferably arranged between the third lens and the aperture diaphragm.

Marginal rays and off-axis light rays are gathered at a position between the third lens and the aperture diaphragm and a position between the aperture diaphragm and the fourth lens. If the rays are shielded at the positions, it is possible to shield light rays passing through relatively-inside regions while the reduction of relative illumination of marginal rays are suppressed at minimum. Thus, if the different stop for shielding marginal rays such that relative illumination is within a range with no practical problems is arranged between the third lens and the aperture diaphragm of between the aperture diaphragm and the fourth lens, the image quality in peripheral regions can be easily improved.

SPECIFIC EXAMPLES

Next, numerical data and the like in imaging lenses according to Examples 1 to 10 will be described together with reference to FIGS. 2 to 21 and Tables 1 to 11. FIGS. 2 to 11 show the schematic configuration of the imaging lenses according to Examples 1 to 10. In FIGS. 2 to 11, the same reference numerals as the reference numerals in FIG. 1 reference the same elements.

Tables 1 to 11 described below show basic data of the respective imaging lenses of Examples 1 to 10.

In Tables 1 to 10, lens data is described in the left portion (in the drawings, indicated by (a)), and the schematic specification of the imaging lens is described in the right portion (in the drawings, indicated by (b)).

With respect to lens data in the left portions of Table 1 to 10, the surface members of the optical members such as the lenses and the like are indicated by i (where i=1, 2, 3, . . . ) in an ascending order from the object side toward the image side. Lens data also includes the surface number of the aperture diaphragm St (i=7), the surface numbers (i=14, 15) of the object-side and image-side surfaces of the optical member Cg1 as a parallel flat plate, and the surface number (i=16) of the imaging surface.

Ri indicates the radius of curvature of the i-th (where i=1, 2, 3, . . . ) surface, and Di (where i=1, 2, 3, . . . ) indicates a surface spacing on the optical axis Z1 between the i-th surface and the (i+1)th surface. Ri indicating the radius of curvature of lens data corresponds to Si (where i=1, 2, 3, . . . ) indicating the lens surface in FIG. 1.

In each lens data, Ndj indicates a refractive index of the j-th (where j=1, 2, 3, . . . ) optical element in an ascending order from the object side toward the image side at the d-line (wavelength 587.6 nm), and vdj indicates an Abbe number of the j-th optical element at the d-line.

The radius of curvature and the surface spacing are in units of mm. The radius of curvature is positive when a lens has a convex surface on the object side and is negative when a lens has a convex surface on the image side.

With regard to the schematic specification in the right portions of Tables 1 to 10, the following values are described.

The values, a distance from the object-side lens surface of the first lens to the imaging surface: L (in Air), a back focal length: Bf (in Air), a focal length of the imaging lens (a composite focal length of the first lens to the sixth lens): f, a focal length of the first lens: f1, a focal length of the second lens: f2, a focal length of the third lens: f3, a focal length of the fourth lens: f4, a focal length of the fifth lens: f5, and a focal length of the sixth lens: f6 are described as the schematic specification. Further, the values, a composite focal length of the first lens and the second lens: f12, a composite focal length of the fourth lens and the fifth lens: f45, a focal length of the front group: f123, a focal length of the rear group: f456, and a maximum image height: IH are described as the schematic specification.

Table 11 shows the values of the parameters in the conditional expressions (1) to (13) for Examples 1 to 10.

TABLE 1

Example 1

(a)
Lens Data

| Surface Number Si | Ri | Di | Ndj | vdj |
|---|---|---|---|---|
| 1 | 24.99 | 1.00 | 1.7550 | 52.3 |
| 2 | 4.22 | 2.19 | | |
| 3 | ∞ | 0.80 | 1.5831 | 59.4 |
| 4 | 3.32 | 1.13 | | |
| 5 | 7.62 | 2.40 | 1.9229 | 20.9 |
| 6 | −55.34 | 2.88 | | |
| St 7 | ∞ | 0.20 | | |

TABLE 1-continued

Example 1

| | | | | |
|---|---|---|---|---|
| 8 | 9.56 | 2.80 | 1.7550 | 52.3 |
| 9 | −3.58 | 0.30 | | |
| 10 | −3.04 | 0.80 | 1.9229 | 18.9 |
| 11 | −6.78 | 0.10 | | |
| 12 | 7.58 | 2.20 | 1.7130 | 53.9 |
| 13 | −21.97 | 2.92 | | |
| 14 | ∞ | 0.40 | 1.5168 | 64.2 |
| 15 | ∞ | 0.50 | | |
| Imaging surface 16 | ∞ | | | |

(b) Schematic Specification

| | |
|---|---|
| L (in Air) | 20.49 |
| Bf (in Air) | 3.68 |
| f | 2.19 |
| f1 | −6.87 |
| f2 | −5.69 |
| f3 | 7.39 |
| f4 | 3.80 |
| f5 | −6.67 |
| f6 | 8.16 |
| f12 | −2.58 |
| f45 | 7.73 |
| f123 | −7.48 |
| f456 | 4.57 |
| IH | 2.4 |

TABLE 2

Example 2

(a) Lens Data

| Surface Number Si | Ri | Di | Ndj | vdj |
|---|---|---|---|---|
| 1 | 24.84 | 1.00 | 1.7550 | 52.3 |
| 2 | 4.42 | 1.81 | | |
| 3 | 10.45 | 0.80 | 1.7550 | 52.3 |
| 4 | 3.22 | 2.18 | | |
| 5 | 9.56 | 2.40 | 1.9229 | 20.9 |
| 6 | −54.10 | 2.31 | | |
| St 7 | ∞ | 0.59 | | |
| 8 | 9.46 | 2.80 | 1.7550 | 52.3 |
| 9 | −3.60 | 0.30 | | |
| 10 | −3.04 | 0.80 | 1.9229 | 18.9 |
| 11 | −7.52 | 0.10 | | |
| 12 | 6.88 | 2.20 | 1.7130 | 53.9 |
| 13 | −28.81 | 2.84 | | |
| 14 | ∞ | 0.40 | 1.5168 | 64.2 |
| 15 | ∞ | 0.50 | | |
| Imaging surface 16 | ∞ | | | |

(b) Schematic Specification

| | |
|---|---|
| L (in Air) | 20.90 |
| Bf (in Air) | 3.60 |
| f | 2.16 |
| f1 | −7.28 |
| f2 | −6.48 |
| f3 | 8.97 |
| f4 | 3.81 |
| f5 | −6.06 |
| f6 | 8.00 |
| f12 | −2.92 |
| f45 | 8.46 |
| f123 | −8.95 |
| f456 | 4.74 |
| IH | 2.4 |

TABLE 3

Example 3

(a) Lens Data

| Surface Number Si | Ri | Di | Ndj | vdj |
|---|---|---|---|---|
| 1 | 16.57 | 1.00 | 1.7550 | 52.3 |
| 2 | 3.22 | 1.38 | | |
| 3 | 9.38 | 0.80 | 1.7550 | 52.3 |
| 4 | 2.85 | 0.81 | | |
| 5 | 7.17 | 2.12 | 1.9229 | 20.9 |
| 6 | −20.98 | 1.66 | | |
| St 7 | ∞ | 0.20 | | |
| 8 | 11.14 | 2.50 | 1.7550 | 52.3 |
| 9 | −2.96 | 0.40 | | |
| 10 | −2.40 | 1.00 | 1.9229 | 18.9 |
| 11 | −4.81 | 0.10 | | |
| 12 | 5.77 | 2.20 | 1.7130 | 53.9 |
| 13 | −29.80 | 2.09 | | |
| 14 | ∞ | 0.50 | 1.5168 | 64.2 |
| 15 | ∞ | 0.50 | | |
| Imaging surface 16 | ∞ | | | |

(b) Schematic Specification

| | |
|---|---|
| L (in Air) | 17.09 |
| Bf (in Air) | 2.92 |
| f | 2.14 |
| f1 | −5.47 |
| f2 | −5.73 |
| f3 | 6.01 |
| f4 | 3.36 |
| f5 | −6.50 |
| f6 | 6.98 |
| f12 | −2.39 |
| f45 | 6.78 |
| f123 | −7.61 |
| f456 | 3.94 |
| IH | 2.4 |

TABLE 4

Example 4

(a) Lens Data

| Surface Number Si | Ri | Di | Ndj | vdj |
|---|---|---|---|---|
| 1 | 15.00 | 1.85 | 1.8348 | 42.7 |
| 2 | 4.48 | 2.29 | | |
| 3 | 0.00 | 0.80 | 1.7550 | 52.3 |
| 4 | 3.13 | 0.96 | | |
| 5 | 6.97 | 2.40 | 1.9229 | 18.9 |
| 6 | −42.03 | 2.52 | | |
| St 7 | ∞ | 0.20 | | |
| 8 | 11.48 | 2.80 | 1.7550 | 52.3 |
| 9 | −3.36 | 0.30 | | |
| 10 | −2.87 | 0.80 | 1.9229 | 18.9 |
| 11 | −5.78 | 0.10 | | |
| 12 | 7.27 | 2.20 | 1.7130 | 53.9 |
| 13 | −16.60 | 3.01 | | |
| 14 | ∞ | 0.40 | 1.5168 | 64.2 |
| 15 | ∞ | 0.50 | | |
| Imaging surface 16 | ∞ | | | |

(b) Schematic Specification

| | |
|---|---|
| L (in Air) | 21.00 |
| Bf (in Air) | 3.77 |

TABLE 4-continued

Example 4

| | |
|---|---|
| f | 2.13 |
| f1 | −8.33 |
| f2 | −4.14 |
| f3 | 6.63 |
| f4 | 3.75 |
| f5 | −7.13 |
| f6 | 7.75 |
| f12 | −2.34 |
| f45 | 7.42 |
| f123 | −6.18 |
| f456 | 4.33 |
| IH | 2.4 |

TABLE 5

Example 5

(a) Lens Data

| Surface Number Si | Ri | Di | Ndj | vdj |
|---|---|---|---|---|
| 1 | 15.00 | 1.91 | 1.8348 | 42.7 |
| 2 | 4.69 | 2.51 | | |
| 3 | −67.69 | 0.88 | 1.7550 | 52.3 |
| 4 | 3.63 | 1.77 | | |
| 5 | 9.45 | 2.40 | 1.8467 | 23.8 |
| 6 | −17.30 | 2.97 | | |
| St 7 | ∞ | 1.17 | | |
| 8 | 13.16 | 2.80 | 1.7550 | 52.3 |
| 9 | −3.80 | 0.30 | | |
| 10 | −3.33 | 0.80 | 1.9229 | 18.9 |
| 11 | −8.33 | 0.10 | | |
| 12 | 6.78 | 2.20 | 1.6779 | 55.3 |
| 13 | −23.50 | 3.34 | | |
| 14 | ∞ | 0.40 | 1.5168 | 64.2 |
| 15 | ∞ | 0.50 | | |
| Imaging surface 16 | ∞ | | | |

(b) Schematic Specification

| | |
|---|---|
| L (in Air) | 23.92 |
| Bf (in Air) | 4.10 |
| f | 2.13 |
| f1 | −8.94 |
| f2 | −4.54 |
| f3 | 7.53 |
| f4 | 4.21 |
| f5 | −6.52 |
| f6 | 8.00 |
| f12 | −2.54 |
| f45 | 10.17 |
| f123 | −9.53 |
| f456 | 5.06 |
| IH | 2.4 |

TABLE 6

Example 6

(a) Lens Data

| Surface Number Si | Ri | Di | Ndj | vdj |
|---|---|---|---|---|
| 1 | 14.20 | 0.90 | 1.7725 | 49.6 |
| 2 | 2.97 | 1.21 | | |
| 3 | 6.82 | 0.90 | 1.7880 | 47.4 |
| 4 | 2.43 | 0.72 | | |

TABLE 6-continued

Example 6

| | | | | |
|---|---|---|---|---|
| 5 | 5.32 | 1.70 | 1.9229 | 20.9 |
| 6 | −60.61 | 1.25 | | |
| St 7 | ∞ | 0.20 | | |
| 8 | 8.06 | 2.20 | 1.7550 | 52.3 |
| 9 | −2.71 | 0.40 | | |
| 10 | −2.13 | 1.00 | 1.9229 | 18.9 |
| 11 | −4.16 | 0.10 | | |
| 12 | 5.61 | 2.10 | 1.7130 | 53.9 |
| 13 | −40.34 | 1.80 | | |
| 14 | ∞ | 0.50 | 1.5168 | 64.2 |
| 15 | ∞ | 0.50 | | |
| Imaging surface 16 | ∞ | | | |

(b) Schematic Specification

| | |
|---|---|
| L (in Air) | 15.30 |
| Bf (in Air) | 2.63 |
| f | 2.13 |
| f1 | −5.04 |
| f2 | −5.27 |
| f3 | 5.36 |
| f4 | 2.94 |
| f5 | −6.16 |
| f6 | 7.04 |
| f12 | −2.17 |
| f45 | 5.57 |
| f123 | −6.20 |
| f456 | 3.60 |
| IH | 2.4 |

TABLE 7

Example 7

(a) Lens Data

| Surface Number Si | Ri | Di | Ndj | vdj |
|---|---|---|---|---|
| 1 | 23.54 | 1.00 | 1.7725 | 49.6 |
| 2 | 3.31 | 1.64 | | |
| 3 | 18.12 | 0.90 | 1.7880 | 47.4 |
| 4 | 3.57 | 0.80 | | |
| 5 | 9.37 | 2.10 | 1.9229 | 20.9 |
| 6 | −17.44 | 2.26 | | |
| St 7 | ∞ | 0.53 | | |
| 8 | 21.28 | 2.45 | 1.7550 | 52.3 |
| 9 | −3.38 | 0.44 | | |
| 10 | −2.75 | 1.00 | 1.9229 | 18.9 |
| 11 | −5.39 | 0.10 | | |
| 12 | 10.84 | 2.20 | 1.7130 | 53.9 |
| 13 | −9.17 | 3.72 | | |
| 14 | ∞ | 0.50 | 1.5168 | 64.2 |
| 15 | ∞ | 0.50 | | |
| Imaging surface 16 | ∞ | | | |

(b) Schematic Specification

| | |
|---|---|
| L (in Air) | 19.97 |
| Bf (in Air) | 4.55 |
| f | 2.14 |
| f1 | −5.10 |
| f2 | −5.79 |
| f3 | 6.86 |
| f4 | 4.04 |
| f5 | −7.41 |
| f6 | 7.30 |
| f12 | −2.28 |
| f45 | 8.93 |
| f123 | −6.04 |

TABLE 7-continued

Example 7

| | |
|---|---|
| f456 | 4.61 |
| IH | 2.4 |

TABLE 8

Example 8

(a) Lens Data

| Surface Number Si | Ri | Di | Ndj | vdj |
|---|---|---|---|---|
| 1 | 18.46 | 1.00 | 1.7725 | 49.6 |
| 2 | 2.97 | 1.27 | | |
| 3 | 8.21 | 0.90 | 1.7880 | 47.4 |
| 4 | 2.79 | 0.69 | | |
| 5 | 5.93 | 1.70 | 1.9229 | 20.9 |
| 6 | −42.79 | 1.52 | | |
| St 7 | ∞ | 0.20 | | |
| 8 | 17.16 | 2.20 | 1.7550 | 52.3 |
| 9 | −2.82 | 0.40 | | |
| 10 | −2.27 | 1.00 | 1.9229 | 18.9 |
| 11 | −4.29 | 0.10 | | |
| 12 | 8.91 | 2.20 | 1.7130 | 53.9 |
| 13 | −8.91 | 2.84 | | |
| 14 | ∞ | 0.50 | 1.5168 | 64.2 |
| 15 | ∞ | 0.50 | | |
| Imaging surface 16 | ∞ | | | |

(b) Schematic Specification

| | |
|---|---|
| L (in Air) | 16.75 |
| Bf (in Air) | 3.67 |
| f | 2.14 |
| f1 | −4.71 |
| f2 | −5.77 |
| f3 | 5.74 |
| f4 | 3.37 |
| f5 | −6.85 |
| f6 | 6.57 |
| f12 | −2.18 |
| f45 | 6.99 |
| f123 | −5.89 |
| f456 | 3.91 |
| IH | 2.4 |

TABLE 9

Example 9

(a) Lens Data

| Surface Number Si | Ri | Di | Ndj | vdj |
|---|---|---|---|---|
| 1 | 20.1926 | 1.0938 | 1.7550 | 52.3 |
| 2 | 4.3916 | 2.4750 | | |
| 3 | ∞ | 0.8000 | 1.7550 | 52.3 |
| 4 | 3.4899 | 1.6635 | | |
| 5 | −28.5642 | 2.4000 | 1.9229 | 20.9 |
| 6 | −7.0607 | 2.9498 | | |
| St 7 | ∞ | 1.9004 | | |
| 8 | 11.7305 | 2.8000 | 1.7550 | 52.3 |
| 9 | −3.4584 | 0.3502 | | |
| 10 | −2.9601 | 1.0003 | 1.9229 | 18.9 |
| 11 | −6.4556 | 0.1000 | | |
| 12 | 5.5165 | 2.2004 | 1.7130 | 53.9 |
| 13 | −177.1909 | 2.3303 | | |

TABLE 9-continued

Example 9

| | | | | |
|---|---|---|---|---|
| 14 | ∞ | 0.4000 | 1.5168 | 64.2 |
| 15 | ∞ | 0.5000 | | |
| Imaging surface 16 | ∞ | 0.0000 | | |

(b) Schematic Specification

| | |
|---|---|
| L (in Air) | 22.82 |
| Bf (in Air) | 3.08 |
| f | 1.45 |
| f1 | −7.63 |
| f2 | −4.60 |
| f3 | 9.54 |
| f4 | 3.83 |
| f5 | −6.79 |
| f6 | 7.51 |
| f12 | −2.34 |
| f45 | 8.12 |
| f123 | −7.16 |
| f456 | 4.39 |
| IH | 1.95 |

TABLE 10

Example 10

(a) Lens Data

| Surface Number Si | Ri | Di | Ndj | vdj |
|---|---|---|---|---|
| 1 | 12.1321 | 0.8000 | 1.7725 | 49.6 |
| 2 | 4.5922 | 2.4830 | | |
| 3 | 11.6323 | 0.7000 | 1.7725 | 49.6 |
| 4 | 2.3456 | 2.2140 | | |
| 5 | −9.3919 | 2.9550 | 1.9229 | 18.9 |
| 6 | −5.9213 | 3.3290 | | |
| St 7 | ∞ | 0.8800 | | |
| 8 | 7.4504 | 2.9000 | 1.6180 | 63.3 |
| 9 | −2.9363 | 0.2610 | | |
| 10 | −2.6236 | 0.8000 | 1.9229 | 18.9 |
| 11 | −5.4232 | 0.2000 | | |
| 12 | 5.4416 | 2.4180 | 1.6180 | 63.3 |
| 13 | −18.5211 | 2.0766 | | |
| 14 | ∞ | 0.5500 | 1.5168 | 64.2 |
| 15 | ∞ | 0.4500 | | |
| Imaging surface 16 | ∞ | 0.0000 | | |

(b) Schematic Specification

| | |
|---|---|
| L (in Air) | 22.83 |
| Bf (in Air) | 2.89 |
| f | 1.30 |
| f1 | −10.03 |
| f2 | −3.93 |
| f3 | 12.33 |
| f4 | 3.81 |
| f5 | −6.38 |
| f6 | 7.08 |
| f12 | −2.37 |
| f45 | 8.27 |
| f123 | −6.85 |
| f456 | 4.49 |
| IH | 1.97 |

TABLE 11

| | Conditional Expression | | | | | | | | | | | | |
|---|---|---|---|---|---|---|---|---|---|---|---|---|---|
| | (1) R10/R9 | (2) \|f12/f\| | (3) \|f123/f456\| | (4) L/f | (5) Bf/f | (6) f45/f | (7) \|f1/f2\| | (8) f3/f | (9) f6/f | (10) D1/f | (11) D8/f | (12) D9/f | (13) f6/IH |
| Example 1 | 0.85 | 1.18 | 1.64 | 9.37 | 1.68 | 3.53 | 1.21 | 3.38 | 3.73 | 0.46 | 1.28 | 0.14 | 3.40 |
| Example 2 | 0.84 | 1.35 | 1.89 | 9.67 | 1.67 | 3.91 | 1.12 | 4.15 | 3.70 | 0.46 | 1.30 | 0.14 | 3.33 |
| Example 3 | 0.81 | 1.12 | 1.93 | 8.00 | 1.37 | 3.17 | 0.96 | 2.81 | 3.26 | 0.47 | 1.17 | 0.19 | 2.90 |
| Example 4 | 0.85 | 1.10 | 1.43 | 9.85 | 1.77 | 3.48 | 2.01 | 3.11 | 3.64 | 0.87 | 1.31 | 0.14 | 3.23 |
| Example 5 | 0.88 | 1.20 | 1.88 | 11.25 | 1.93 | 4.79 | 1.97 | 3.54 | 3.76 | 0.90 | 1.32 | 0.14 | 3.33 |
| Example 6 | 0.79 | 1.02 | 1.72 | 7.19 | 1.24 | 2.62 | 0.96 | 2.52 | 3.31 | 0.42 | 1.03 | 0.19 | 2.93 |
| Example 7 | 0.81 | 1.06 | 1.31 | 9.34 | 2.13 | 4.17 | 0.88 | 3.21 | 3.41 | 0.47 | 1.15 | 0.21 | 3.04 |
| Example 8 | 0.80 | 1.02 | 1.51 | 7.82 | 1.71 | 3.26 | 0.82 | 2.68 | 3.07 | 0.47 | 1.03 | 0.19 | 2.74 |
| Example 9 | 0.86 | 1.62 | 1.63 | 15.79 | 2.13 | 5.62 | 1.66 | 6.60 | 5.19 | 0.76 | 1.94 | 0.24 | 3.85 |
| Example 10 | 0.89 | 1.82 | 1.53 | 17.55 | 2.22 | 6.36 | 2.55 | 9.47 | 5.44 | 0.61 | 2.23 | 0.20 | 3.59 |
| MAX | 0.89 | 1.82 | 1.93 | 17.55 | 2.22 | 6.36 | 2.55 | 9.47 | 5.44 | 0.90 | 2.23 | 0.24 | 3.85 |
| MIN | 0.79 | 1.02 | 1.31 | 7.19 | 1.24 | 2.62 | 0.82 | 2.52 | 3.07 | 0.42 | 1.03 | 0.14 | 2.74 |
| Upper Limit | 1.00 | 1.80 | 2.20 | 18.00 | 3.00 | 6.50 | 2.80 | 10.00 | 5.80 | — | 2.40 | 1.00 | 4.00 |
| Lower Limit | 0.50 | 0.80 | 1.00 | 5.00 | 0.80 | 2.00 | 0.50 | 2.00 | 2.00 | 0.40 | 0.80 | 0.10 | 2.00 |

FIGS. 12 to 21 are diagrams showing aberrations of the imaging lenses of Examples 1 to 10. FIGS. 12 to 21 respectively show aberrations with respect to the d-line (wavelength 587.6 nm), the F-line (wavelength 486.1 nm), and the C-line (wavelength 656.3 nm) for the imaging lenses of Examples 1 to 10. A two-dot-chain line indicates a sine condition (in the drawings, indicated by SNC).

The aberration diagram of distortion shows a deviation amount from an ideal image height expressed by f×tan θ where f is the focal length of the imaging lens, and θ is a half angle of view (handled as a variable, $0 \leq \theta \leq \omega$).

In the aberration drawings, the d-line (587.6 nm) is indicated by a solid line, the F-line (486.1 nm) is indicated by a broken line, and the C-line (656.3 nm) is indicated by a one-dot-chain line.

As will be understood from the drawings showing basic data and the aberrations of Examples 1 to 10, with the imaging lens according to the embodiment of the invention, environmental resistance can be improved by optimizing the shape or material of each lens without causing deterioration in lens performance or an increase in manufacturing cost.

The invention is not limited to the foregoing embodiment and the examples, and various modifications may be made. For example, the values of the radius of curvature, the on-axis surface spacing, and the refractive index of the respective lens component are not limited to the numerical values described in the drawings, and other values may be used.

Figure 22:
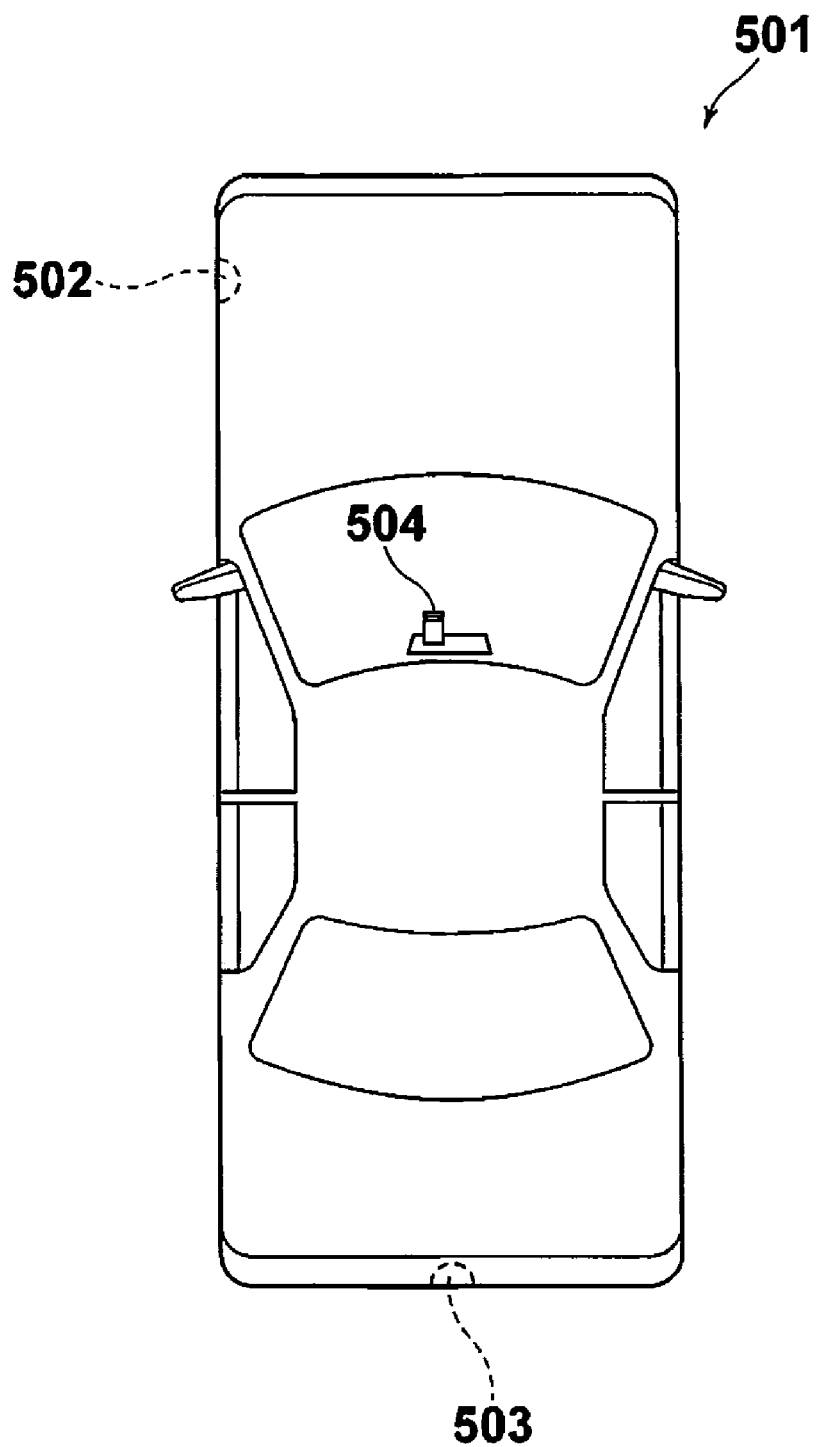
FIG. 22 is a diagram showing an automobile on which onboard equipment including an imaging apparatus according to an embodiment of the invention is mounted.

FIG. 22 is a diagram showing an automobile on which an onboard camera as an example of the imaging apparatus according to the embodiment of the invention including the imaging lens according to the embodiment of the invention and the imaging device receiving light for forming an optical image formed on the light receiving surface by the imaging lens, converting received light into an electrical signal, and outputting the electrical signal.

As shown in FIG. 22, onboard equipment 502 to 504 including the imaging apparatus according to the embodiment of the invention can be mounted on an automobile 501 or the like and then used. The onboard equipment 502 is an external camera for imaging the blind range on the lateral side of a front passenger seat. The onboard equipment 503 is an external camera for imaging the blind range on the rear side of the automobile 501. The onboard equipment 504 is an internal camera which is attached to the rear surface of a room mirror to image the same for imaging the same field of view as the driver.

What is claimed is:

1. An imaging lens consisting: in order from an object side thereof,
   a front group having a negative power;
   a stop; and
   a rear group having a positive power,
   wherein the front group consists of, in order from the object side, a first lens having a negative power and having a concave surface on an image side thereof, a second lens having a negative power where an object-side lens surface thereof has a radius of curvature whose absolute value is larger than that of an image-side lens surface thereof, and a third lens having a positive power,
   the rear group consists of, in order from the object side, a fourth lens having a positive power, a fifth lens having a negative power and having a meniscus shape with a concave surface on the object side, and a sixth lens having a positive power,
   each of the first lens, the second lens, the fourth lens, and the sixth lens has an Abbe number of 40 or more at the d-line, and each of the third lens and the fifth lens has an Abbe number of 40 or less at the d-line, and
   each lens in the front group and the rear group is a single lens.

2. An imaging lens consisting: in order from an object side thereof,
   a front group having a negative power;
   a stop; and
   a rear group having a positive power,
   wherein the front group consists of, in order from the object side, a first lens having a negative power and having a concave surface on an image side, a second lens having a negative power, and a third lens having a positive power,
   the rear group consists of two lenses each having a positive power and one lens having a negative power,
   each of the first lens and the second lens has an Abbe number of 45 or more at the d-line, and the third lens has an Abbe number of 25 or less at the d-line,
   the lens having the negative power in the rear group has an Abbe number of 25 or less at the d-line, and each of the two lenses each having the positive power in the rear group has an Abbe number of 45 or more at the d-line,
   each lens in the front group and the rear group is a single lens, and
   a distance from an object-side lens surface of the first lens to the imaging surface of the imaging lens is equal to or smaller than 18 mm.

3. The imaging lens according to claim 1, wherein the third lens has a biconvex shape where an object-side lens surface thereof has a radius of curvature whose absolute value is smaller than that of an image-side lens surface thereof.

4. The imaging lens according to claim 1, wherein each of the two lenses each having the positive power in the rear group has a biconvex shape.

5. The imaging lens according to claim 1, wherein the second lens is a lens having a plano-concave shape with a flat surface on the object side or a meniscus lens where an object-side lens surface thereof has a radius of curvature whose absolute value is larger than that of an image-side lens surface thereof.

6. The imaging lens according to claim 1, wherein the following conditional expression (1) is satisfied:

$$0.5 < R10/R9 < 1.0 \quad (1)$$

wherein

R9 represents a radius of curvature of an image-side lens surface of a lens nearest to the object side among the lenses in the rear group; and R10 represents a radius of curvature of an object-side lens surface of a lens adjacent to the image side of a lens nearest to the object side among the lenses in the rear group.

7. The imaging lens according to claim 1, wherein the following conditional expression (2) is satisfied:

$$0.8 < |f12/f| < 1.8 \quad (2)$$

wherein f represents a focal length of the imaging lens, and f12 represents a composite focal length of the first lens and the second lens.

8. The imaging lens according to claim 1, wherein the following conditional expression (3) is satisfied:

$$1.0 < |f123/f456| < 2.2 \quad (3)$$

wherein f123 represents a composite focal length of the front group, and f456 represents a composite focal length of the rear group.

9. The imaging lens according to claim 1, wherein the following conditional expression (4) is satisfied:

$$5 < L/f < 18 \quad (4)$$

wherein f represents a focal length of the imaging lens, and

L represents a distance from the object-side lens surface of the first lens to the imaging surface of the imaging lens.

10. The imaging lens according to claim 1, wherein the following conditional expression (5) is satisfied:

$$0.5 < Bf/f < 3.0 \quad (5)$$

wherein f represents a focal length of the imaging lens, and

Bf represents a back focal length of the imaging lens.

11. The imaging lens according to claim 1, wherein the following conditional expression (6) is satisfied:

$$2.0 < f45/f < 6.5 \quad (6)$$

wherein f represents a focal length of the imaging lens, and f45 represents a composite focal length of two adjacent lenses nearest to the object side from among the lenses constituting the rear group.

12. The imaging lens according to claim 1, wherein each of the first lens to the sixth lens is a glass lens.

13. The imaging lens according to claim 2, wherein the third lens has a biconvex shape where an object-side lens surface thereof has a radius of curvature whose absolute value is smaller than that of an image-side lens surface thereof.

14. The imaging lens according to claim 2, wherein each of the two lenses each having the positive power in the rear group has a biconvex shape.

15. The imaging lens according to claim 2, wherein the second lens is a lens having a plano-concave shape with a flat surface on the object side or a meniscus lens where an object-side lens surface thereof has a radius of curvature whose absolute value is larger than that of an image-side lens surface thereof.

16. The imaging lens according to claim 2, wherein the following conditional expression (1) is satisfied:

$$0.5 < R10/R9 < 1.0 \quad (1)$$

wherein

R9 represents a radius of curvature of an image-side lens surface of a lens nearest to the object side among the lenses in the rear group; and R10 represents a radius of curvature of an object-side lens surface of a lens adjacent to the image side of a lens nearest to the object side among the lenses in the rear group.

17. The imaging lens according to claim 2, wherein the following conditional expression (2) is satisfied:

$$0.8 < |f12/f| < 1.5 \quad (2)$$

wherein f represents a focal length of the imaging lens, and f12 represents a composite focal length of the first lens and the second lens.

18. The imaging lens according to claim 2, wherein the following conditional expression (3) is satisfied:

$$1.0 < |f123/f456| < 2.2 \quad (3)$$

wherein f123 represents a composite focal length of the front group, and f456 represents a composite focal length of the rear group.

19. The imaging lens according to claim 2, wherein the following conditional expression (4) is satisfied:

$$5 < L/f < 13 \quad (4)$$

wherein f represents a focal length of the imaging lens, and

L represents a distance from the object-side lens surface of the first lens to the imaging surface of the imaging lens.

20. The imaging lens according to claim 2, wherein the following conditional expression (5) is satisfied:

$$0.5 < Bf/f < 3.0 \quad (5)$$

wherein f represents a focal length of the imaging lens, and

Bf represents a back focal length of the imaging lens.

21. The imaging lens according to claim 2,
wherein the following conditional expression (6) is satisfied:

$$2.0 < f45/f < 5.2 \qquad (6)$$

wherein f represents a focal length of the imaging lens, and f45 represents a composite focal length of two adjacent lenses nearest to the object side from among the lenses constituting the rear group.

22. The imaging lens according to claim 2, wherein each of the first lens to the sixth lens is a glass lens.

23. An imaging apparatus comprising:
an imaging lens according to claim 1; and
an imaging device converting an optical image formed by the imaging lens into an electrical signal.

24. An imaging apparatus comprising:
an imaging lens according to claim 2; and
an imaging device converting an optical image formed by the imaging lens into an electrical signal.

* * * * *